United States Patent
Hoelter et al.

(10) Patent No.: US 9,473,681 B2
(45) Date of Patent: Oct. 18, 2016

(54) INFRARED CAMERA SYSTEM HOUSING WITH METALIZED SURFACE

(71) Applicant: FLIR Systems, Inc., Wilsonville, OR (US)

(72) Inventors: Theodore R. Hoelter, Goleta, CA (US); Joseph Kostrzewa, Buellton, CA (US); Pierre Boulanger, Goleta, CA (US); Barbara Sharp, Santa Barbara, CA (US); Eric A. Kurth, Santa Barbara, CA (US)

(73) Assignee: FLIR Systems, Inc., Wilsonville, OR (US)

( * ) Notice: Subject to any disclaimer, the term of this patent is extended or adjusted under 35 U.S.C. 154(b) by 532 days.

(21) Appl. No.: 13/966,052

(22) Filed: Aug. 13, 2013

(65) Prior Publication Data

US 2013/0329054 A1 Dec. 12, 2013

Related U.S. Application Data

(63) Continuation-in-part of application No. PCT/US2012/041744, filed on Jun. 8, 2012, and a continuation-in-part of application No. PCT/US2012/041749, filed on Jun. 8, 2012,
(Continued)

(51) Int. Cl.
*H04N 5/225* (2006.01)
*H04N 5/33* (2006.01)

(52) U.S. Cl.
CPC .......... *H04N 5/2252* (2013.01); *H04N 5/2257* (2013.01); *H04N 5/33* (2013.01)

(58) Field of Classification Search
CPC .................................................. H04N 5/2252
See application file for complete search history.

(56) References Cited

U.S. PATENT DOCUMENTS

| 2,764,055 A | 9/1956 | Clemens et al. | |
| 4,967,081 A * | 10/1990 | Quad | G01J 5/34 250/338.1 |

(Continued)

FOREIGN PATENT DOCUMENTS

| CA | 2764055 | 7/2012 |
| CN | 2874947 | 2/2007 |

(Continued)

OTHER PUBLICATIONS

DARPA, "Broad Agency Announcement Low Cost Thermal Imager Manufacturing (LCTI-M)", Microsystems Technology Office, DARPA-BAA-11-27, Jan. 24, 2011. pp. 1-42, Arlington, VA.

*Primary Examiner* — James Pontius
(74) *Attorney, Agent, or Firm* — Haynes and Boone, LLP

(57) ABSTRACT

A housing for an infrared camera module may be implemented with a substantially non-metal cover configured to substantially or completely enclose various components of an infrared imaging device. A metal layer may be disposed on various interior and/or exterior surfaces of the cover. Such implementations may be used to reduce the effects of various environmental conditions which may otherwise adversely affect the performance of the infrared imaging device. In addition, one or more conductive traces may be built into the housing and/or on interior surfaces of the housing to facilitate the passing of signals from components of the infrared imaging device such as infrared sensors, read out circuitry, a temperature measurement component, and/or other components. One or more fiducial markers may be provided to align various components of the infrared camera module during manufacture.

24 Claims, 33 Drawing Sheets

Related U.S. Application Data application No. 13/966,052, which is a continuation-in-part of application No. PCT/US2012/041739, filed on Jun. 8, 2012.

(60) Provisional application No. 61/683,124, filed on Aug. 14, 2012, provisional application No. 61/656,889, filed on Jun. 7, 2012, provisional application No. 61/545,056, filed on Oct. 7, 2011, provisional application No. 61/495,873, filed on Jun. 10, 2011, provisional application No. 61/495,879, filed on Jun. 10, 2011, provisional application No. 61/495,888, filed on Jun. 10, 2011, provisional application No. 61/545,056, filed on Oct. 7, 2011.

(56) References Cited

U.S. PATENT DOCUMENTS

| | | |
|---|---|---|
| 5,128,796 A | 7/1992 | Barney et al. |
| 5,199,884 A * | 4/1993 | Kaufman ............ H01R 12/716 439/566 |
| 6,348,951 B1 | 2/2002 | Kim |
| 6,396,543 B1 | 5/2002 | Shin et al. |
| 6,424,843 B1 | 7/2002 | Reitmaa et al. |
| 6,435,711 B1 * | 8/2002 | Gerlitz .................. G01J 5/02 374/130 |
| 6,633,231 B1 | 10/2003 | Okamoto et al. |
| 6,681,120 B1 | 1/2004 | Kim |
| 6,707,044 B2 | 3/2004 | Lannestedt et al. |
| 6,759,949 B2 | 7/2004 | Miyahara |
| 6,883,054 B2 | 4/2005 | Yamaguchi et al. |
| 6,911,652 B2 | 6/2005 | Walkenstein |
| 7,050,107 B1 | 5/2006 | Frank et al. |
| D524,785 S | 7/2006 | Huang |
| 7,084,857 B2 | 8/2006 | Lieberman et al. |
| 7,208,733 B2 | 4/2007 | Mian et al. |
| 7,263,379 B1 | 8/2007 | Parkulo et al. |
| 7,284,921 B2 | 10/2007 | Lapstun et al. |
| 7,296,747 B2 | 11/2007 | Rohs |
| 7,305,368 B2 | 12/2007 | Lieberman et al. |
| 7,321,783 B2 | 1/2008 | Kim |
| 7,333,832 B2 | 2/2008 | Tsai et al. |
| 7,377,835 B2 | 5/2008 | Parkulo et al. |
| 7,420,663 B2 | 9/2008 | Wang et al. |
| 7,453,064 B2 | 11/2008 | Lee |
| 7,470,902 B1 | 12/2008 | Kraemer et al. |
| 7,477,309 B2 | 1/2009 | Cuccias |
| 7,567,818 B2 | 7/2009 | Pylkko |
| 7,572,077 B2 | 8/2009 | Lapstun et al. |
| 7,575,077 B2 | 8/2009 | Priepke et al. |
| 7,595,904 B2 | 9/2009 | Lapstun et al. |
| 7,627,364 B2 | 12/2009 | Sato |
| 7,697,962 B2 | 4/2010 | Cradick et al. |
| 7,723,686 B2 | 5/2010 | Hannebauer |
| 7,725,141 B2 | 5/2010 | Su |
| 7,728,281 B2 | 6/2010 | Chen |
| 7,735,974 B2 | 6/2010 | Silverbrook et al. |
| 7,747,454 B2 | 6/2010 | Bartfeld et al. |
| 7,760,919 B2 | 7/2010 | Namgoong |
| 7,761,114 B2 | 7/2010 | Silverbrook et al. |
| 7,773,870 B2 | 8/2010 | Naruse |
| 7,801,733 B2 | 9/2010 | Lee et al. |
| 7,810,733 B2 | 10/2010 | Silverbrook et al. |
| 7,872,574 B2 | 1/2011 | Betts et al. |
| 7,900,842 B2 | 3/2011 | Silverbrook et al. |
| 7,903,152 B2 | 3/2011 | Kim |
| 7,947,222 B2 | 5/2011 | Bae et al. |
| 7,960,700 B2 | 6/2011 | Craig et al. |
| 8,049,163 B1 | 11/2011 | Granneman et al. |
| 8,153,980 B1 | 4/2012 | Brady et al. |
| 8,275,413 B1 | 9/2012 | Fraden et al. |
| 8,305,577 B2 | 11/2012 | Kivioja et al. |
| 8,345,226 B2 | 1/2013 | Zhang |
| 8,537,343 B2 | 9/2013 | Zhang |
| 8,781,420 B2 | 7/2014 | Schlub et al. |
| 8,825,112 B1 | 9/2014 | Fraden et al. |
| 2002/0006337 A1 | 1/2002 | Kimura et al. |
| 2002/0122036 A1 | 9/2002 | Sasaki |
| 2002/0135571 A1 | 9/2002 | Klocek et al. |
| 2002/0140542 A1 | 10/2002 | Prokoski et al. |
| 2002/0149600 A1 | 10/2002 | Van Splunter et al. |
| 2003/0007193 A1 | 1/2003 | Sato et al. |
| 2003/0112871 A1 | 6/2003 | Demos |
| 2003/0122957 A1 | 7/2003 | Emme |
| 2003/0223623 A1 | 12/2003 | Gutta et al. |
| 2004/0047518 A1 | 3/2004 | Tiana |
| 2004/0101298 A1 | 5/2004 | Mandelbaum et al. |
| 2004/0127156 A1 | 7/2004 | Park |
| 2004/0128070 A1 | 7/2004 | Schmidt et al. |
| 2004/0157612 A1 | 8/2004 | Kim |
| 2004/0165788 A1 | 8/2004 | Perez et al. |
| 2004/0169860 A1 | 9/2004 | Jung et al. |
| 2004/0200632 A1 * | 10/2004 | Kanai ............... G03G 21/1619 174/385 |
| 2004/0207036 A1 | 10/2004 | Ikeda |
| 2004/0211907 A1 | 10/2004 | Wellman et al. |
| 2004/0256561 A1 | 12/2004 | Beuhler et al. |
| 2005/0030314 A1 | 2/2005 | Dawson |
| 2005/0067852 A1 | 3/2005 | Jeong |
| 2005/0068333 A1 | 3/2005 | Nakahashi et al. |
| 2005/0089241 A1 | 4/2005 | Kawanishi et al. |
| 2005/0093890 A1 | 5/2005 | Baudisch |
| 2005/0110803 A1 | 5/2005 | Sugimura |
| 2005/0138569 A1 | 6/2005 | Baxter et al. |
| 2005/0169655 A1 | 8/2005 | Koyama et al. |
| 2005/0184993 A1 | 8/2005 | Ludwin et al. |
| 2005/0213813 A1 | 9/2005 | Lin et al. |
| 2005/0213853 A1 | 9/2005 | Maier et al. |
| 2005/0219249 A1 | 10/2005 | Xie et al. |
| 2005/0248912 A1 | 11/2005 | Kang et al. |
| 2005/0265688 A1 | 12/2005 | Kobayashi |
| 2005/0270784 A1 | 12/2005 | Hahn et al. |
| 2005/0277447 A1 | 12/2005 | Buil et al. |
| 2006/0039686 A1 | 2/2006 | Soh et al. |
| 2006/0060984 A1 | 3/2006 | Wakabayashi et al. |
| 2006/0077246 A1 | 4/2006 | Kawakami et al. |
| 2006/0097172 A1 | 5/2006 | Park |
| 2006/0120712 A1 | 6/2006 | Kim |
| 2006/0132642 A1 | 6/2006 | Hosaka et al. |
| 2006/0140501 A1 | 6/2006 | Tadas |
| 2006/0147191 A1 | 7/2006 | Kim |
| 2006/0154559 A1 | 7/2006 | Yoshida |
| 2006/0210249 A1 | 9/2006 | Seto |
| 2006/0234744 A1 | 10/2006 | Sung et al. |
| 2006/0240867 A1 | 10/2006 | Wang et al. |
| 2006/0279758 A1 | 12/2006 | Myoki |
| 2006/0285907 A1 | 12/2006 | Kang et al. |
| 2007/0004449 A1 | 1/2007 | Sham |
| 2007/0019077 A1 | 1/2007 | Park |
| 2007/0019099 A1 | 1/2007 | Lieberman et al. |
| 2007/0019103 A1 | 1/2007 | Lieberman et al. |
| 2007/0033309 A1 | 2/2007 | Kuwabara et al. |
| 2007/0034800 A1 | 2/2007 | Huang |
| 2007/0052616 A1 | 3/2007 | Yoon |
| 2007/0057764 A1 | 3/2007 | Sato et al. |
| 2007/0103479 A1 | 5/2007 | Kim et al. |
| 2007/0120879 A1 | 5/2007 | Kanade et al. |
| 2007/0132858 A1 | 6/2007 | Chiba et al. |
| 2007/0139739 A1 | 6/2007 | Kim et al. |
| 2007/0159524 A1 | 7/2007 | Kim et al. |
| 2007/0189583 A1 | 8/2007 | Shimada et al. |
| 2007/0211965 A1 | 9/2007 | Helbing et al. |
| 2007/0222798 A1 | 9/2007 | Kuno |
| 2007/0248284 A1 | 10/2007 | Bernsen et al. |
| 2007/0274541 A1 | 11/2007 | Uetake et al. |
| 2007/0285439 A1 | 12/2007 | King et al. |
| 2007/0286517 A1 | 12/2007 | Paik et al. |
| 2007/0299226 A1 | 12/2007 | Park et al. |
| 2008/0038579 A1 | 2/2008 | Schuisky et al. |
| 2008/0056612 A1 | 3/2008 | Park et al. |
| 2008/0079834 A1 | 4/2008 | Chung et al. |
| 2008/0112012 A1 | 5/2008 | Yokoyama et al. |
| 2008/0151056 A1 | 6/2008 | Ahamefula |
| 2008/0165190 A1 | 7/2008 | Min et al. |

(56) References Cited

U.S. PATENT DOCUMENTS

| | | |
|---|---|---|
| 2008/0165342 A1 | 7/2008 | Yoshida et al. |
| 2008/0170082 A1 | 7/2008 | Kim |
| 2008/0218474 A1 | 9/2008 | Ahn et al. |
| 2008/0248833 A1 | 10/2008 | Silverbrook et al. |
| 2008/0266079 A1 | 10/2008 | Lontka |
| 2008/0278772 A1 | 11/2008 | Silverbrook et al. |
| 2008/0284880 A1 | 11/2008 | Numata |
| 2008/0292144 A1 | 11/2008 | Kim |
| 2008/0297614 A1 | 12/2008 | Lieberman et al. |
| 2009/0023421 A1 | 1/2009 | Parkulo et al. |
| 2009/0027525 A1 | 1/2009 | Lin et al. |
| 2009/0040042 A1 | 2/2009 | Lontka |
| 2009/0040195 A1 | 2/2009 | Njolstad et al. |
| 2009/0052883 A1 | 2/2009 | Lee et al. |
| 2009/0129700 A1 | 5/2009 | Rother et al. |
| 2009/0131104 A1 | 5/2009 | Yoon |
| 2009/0148019 A1 | 6/2009 | Hamada et al. |
| 2009/0213110 A1 | 8/2009 | Kato et al. |
| 2009/0215479 A1 | 8/2009 | Karmarkar |
| 2009/0227287 A1 | 9/2009 | Kotidis |
| 2009/0238238 A1 | 9/2009 | Hollander et al. |
| 2009/0278048 A1 | 11/2009 | Choe et al. |
| 2009/0297062 A1 | 12/2009 | Molne et al. |
| 2010/0066866 A1 | 3/2010 | Lim |
| 2010/0090965 A1 | 4/2010 | Birkler |
| 2010/0090983 A1 | 4/2010 | Challener et al. |
| 2010/0097519 A1 | 4/2010 | Byrne et al. |
| 2010/0103141 A1 | 4/2010 | Challener et al. |
| 2010/0113068 A1 | 5/2010 | Rothschild |
| 2010/0131268 A1 | 5/2010 | Moeller |
| 2010/0144387 A1 | 6/2010 | Chou |
| 2010/0163730 A1 | 7/2010 | Schmidt et al. |
| 2010/0234067 A1 | 9/2010 | Silverbrook et al. |
| 2010/0245582 A1 | 9/2010 | Harel |
| 2010/0245585 A1 | 9/2010 | Fisher et al. |
| 2010/0245826 A1 | 9/2010 | Lee |
| 2010/0314543 A1 | 12/2010 | Lee et al. |
| 2011/0043486 A1 | 2/2011 | Hagiwara et al. |
| 2011/0063446 A1 | 3/2011 | McMordie et al. |
| 2011/0102599 A1 | 5/2011 | Kwon et al. |
| 2011/0117532 A1 | 5/2011 | Relyea et al. |
| 2011/0121978 A1 | 5/2011 | Schwörer et al. |
| 2011/0122075 A1 | 5/2011 | Seo et al. |
| 2011/0128384 A1 | 6/2011 | Tiscareno et al. |
| 2012/0007987 A1 | 1/2012 | Gaber |
| 2012/0083314 A1 | 4/2012 | Ng et al. |
| 2012/0184252 A1 | 7/2012 | Hirsch |
| 2012/0273688 A1 | 11/2012 | Tsai et al. |
| 2012/0274814 A1 | 11/2012 | Wajs |
| 2012/0276954 A1 | 11/2012 | Kowalsky |
| 2012/0292518 A1 | 11/2012 | Goldstein |
| 2012/0320086 A1 | 12/2012 | Kasama et al. |
| 2013/0204570 A1 | 8/2013 | Mendelson et al. |
| 2013/0320220 A1 | 12/2013 | Donowsky |

FOREIGN PATENT DOCUMENTS

| | | |
|---|---|---|
| CN | 2899321 | 5/2007 |
| CN | 201203922 | 3/2009 |
| CN | 101635754 | 1/2010 |
| CN | 201481406 | 5/2010 |
| CN | 201550169 | 8/2010 |
| CN | 101859209 | 10/2010 |
| CN | 201628839 | 11/2010 |
| CN | 101945154 | 1/2011 |
| CN | 102045423 | 5/2011 |
| CN | 102045448 | 5/2011 |
| CN | 102055836 | 5/2011 |
| CN | 201869255 | 6/2011 |
| CN | 201897853 | 7/2011 |
| CN | 102178510 | 9/2011 |
| CN | 202261481 | 5/2012 |
| CN | 102880289 | 1/2013 |
| CN | 202998279 | 6/2013 |
| DE | 102006057431 | 6/2008 |
| EP | 0398725 | 11/1990 |
| EP | 0837600 | 4/1998 |
| EP | 2477391 | 7/2012 |
| JP | 1997275518 | 4/1999 |
| JP | 2004048571 | 2/2004 |
| JP | 2006098098 | 4/2006 |
| JP | 2006105655 | 4/2006 |
| JP | 2007006475 | 1/2007 |
| JP | 2007325842 | 12/2007 |
| JP | 2010181324 | 8/2010 |
| JP | 2012231309 | 11/2012 |
| KR | 20000026757 | 5/2000 |
| KR | 100227582 | 11/2000 |
| KR | 100272582 | 11/2000 |
| KR | 20000073381 | 12/2000 |
| KR | 100285817 | 1/2001 |
| KR | 20010001341 | 1/2001 |
| KR | 20010002462 | 1/2001 |
| KR | 20010010010 | 2/2001 |
| KR | 20010014992 | 2/2001 |
| KR | 20010044756 | 6/2001 |
| KR | 20010050263 | 6/2001 |
| KR | 20010060752 | 7/2001 |
| KR | 20010068202 | 7/2001 |
| KR | 20010070355 | 7/2001 |
| KR | 20010074565 | 8/2001 |
| KR | 20020006967 | 1/2002 |
| KR | 20020044339 | 6/2002 |
| KR | 20020049605 | 6/2002 |
| KR | 20060071220 | 6/2002 |
| KR | 20020061406 | 7/2002 |
| KR | 20020061920 | 7/2002 |
| KR | 20020069690 | 9/2002 |
| KR | 20020078469 | 10/2002 |
| KR | 20020083368 | 11/2002 |
| KR | 20020083961 | 11/2002 |
| KR | 20020085124 | 11/2002 |
| KR | 20020085490 | 11/2002 |
| KR | 20020095752 | 12/2002 |
| KR | 20030000332 | 1/2003 |
| KR | 20030007030 | 1/2003 |
| KR | 20030012444 | 2/2003 |
| KR | 20030016607 | 3/2003 |
| KR | 20030024545 | 3/2003 |
| KR | 20030037101 | 5/2003 |
| KR | 20030051140 | 6/2003 |
| KR | 20030055693 | 7/2003 |
| KR | 20030056667 | 7/2003 |
| KR | 20030067116 | 8/2003 |
| KR | 20030085742 | 11/2003 |
| KR | 20030088968 | 11/2003 |
| KR | 20040001684 | 1/2004 |
| KR | 20040001686 | 1/2004 |
| KR | 20040023826 | 3/2004 |
| KR | 20040027692 | 4/2004 |
| KR | 20040033223 | 4/2004 |
| KR | 20040033532 | 4/2004 |
| KR | 20040033986 | 4/2004 |
| KR | 20040033993 | 4/2004 |
| KR | 20040039868 | 5/2004 |
| KR | 20040040296 | 5/2004 |
| KR | 20040042475 | 5/2004 |
| KR | 20040044624 | 5/2004 |
| KR | 100437890 | 6/2004 |
| KR | 20040054416 | 6/2004 |
| KR | 20040058969 | 7/2004 |
| KR | 20040062802 | 7/2004 |
| KR | 20040064855 | 7/2004 |
| KR | 20040066724 | 7/2004 |
| KR | 20040068864 | 8/2004 |
| KR | 20040070840 | 8/2004 |
| KR | 20040076308 | 9/2004 |
| KR | 20040086994 | 10/2004 |
| KR | 20040102386 | 12/2004 |
| KR | 20050008245 | 1/2005 |
| KR | 20050011313 | 1/2005 |
| KR | 20050012505 | 2/2005 |
| KR | 20050014448 | 2/2005 |
| KR | 20050015293 | 2/2005 |

(56) References Cited

FOREIGN PATENT DOCUMENTS

| | | |
|---|---|---|
| KR | 20050015526 | 2/2005 |
| KR | 20050015745 | 2/2005 |
| KR | 20050018370 | 2/2005 |
| KR | 20050023950 | 3/2005 |
| KR | 20050028537 | 3/2005 |
| KR | 20050033308 | 4/2005 |
| KR | 101006660 | 9/2005 |
| KR | 1020050095463 | 9/2005 |
| KR | 100547739 | 1/2006 |
| KR | 20060023957 | 3/2006 |
| KR | 1020060019715 | 3/2006 |
| KR | 100645746 | 5/2006 |
| KR | 20060054877 | 5/2006 |
| KR | 100612890 | 8/2006 |
| KR | 100633792 | 10/2006 |
| KR | 100646966 | 11/2006 |
| KR | 20060119077 | 11/2006 |
| KR | 20060119236 | 11/2006 |
| KR | 20060120318 | 11/2006 |
| KR | 20060121595 | 11/2006 |
| KR | 100660125 | 12/2006 |
| KR | 100663528 | 1/2007 |
| KR | 100672377 | 1/2007 |
| KR | 20070002590 | 1/2007 |
| KR | 20070005263 | 1/2007 |
| KR | 20070005553 | 1/2007 |
| KR | 20070009380 | 1/2007 |
| KR | 100677913 | 2/2007 |
| KR | 100689465 | 3/2007 |
| KR | 20070028201 | 3/2007 |
| KR | 100722974 | 5/2007 |
| KR | 100729813 | 6/2007 |
| KR | 20070067650 | 6/2007 |
| KR | 100743171 | 7/2007 |
| KR | 100743254 | 7/2007 |
| KR | 20070068501 | 7/2007 |
| KR | 20070078477 | 8/2007 |
| KR | 20070082960 | 8/2007 |
| KR | 20070087513 | 8/2007 |
| KR | 20070091486 | 9/2007 |
| KR | 100766953 | 10/2007 |
| KR | 100771364 | 10/2007 |
| KR | 20070104957 | 10/2007 |
| KR | 100777428 | 11/2007 |
| KR | 20070115754 | 12/2007 |
| KR | 20070122344 | 12/2007 |
| KR | 20070122345 | 12/2007 |
| KR | 100802525 | 2/2008 |
| KR | 20080013314 | 2/2008 |
| KR | 20080015099 | 2/2008 |
| KR | 20080015100 | 2/2008 |
| KR | 20080015973 | 2/2008 |
| KR | 20080018407 | 2/2008 |
| KR | 100822053 | 4/2008 |
| KR | 20080045551 | 5/2008 |
| KR | 100841243 | 6/2008 |
| KR | 20080053057 | 6/2008 |
| KR | 20080054596 | 6/2008 |
| KR | 100846192 | 7/2008 |
| KR | 20080059882 | 7/2008 |
| KR | 20080069007 | 7/2008 |
| KR | 100854932 | 8/2008 |
| KR | 20080071070 | 8/2008 |
| KR | 20080078315 | 8/2008 |
| KR | 100866177 | 10/2008 |
| KR | 100866475 | 11/2008 |
| KR | 100866476 | 11/2008 |
| KR | 100866573 | 11/2008 |
| KR | 100870724 | 11/2008 |
| KR | 20080096918 | 11/2008 |
| KR | 20080098409 | 11/2008 |
| KR | 100871916 | 12/2008 |
| KR | 20080112331 | 12/2008 |
| KR | 20090003899 | 1/2009 |
| KR | 20090018486 | 2/2009 |
| KR | 20090020864 | 2/2009 |
| KR | 100888554 | 3/2009 |
| KR | 20090036734 | 4/2009 |
| KR | 100897170 | 5/2009 |
| KR | 20090052526 | 5/2009 |
| KR | 100901784 | 6/2009 |
| KR | 100903348 | 6/2009 |
| KR | 20090089931 | 8/2009 |
| KR | 100922497 | 10/2009 |
| KR | 20090105424 | 10/2009 |
| KR | 100932752 | 12/2009 |
| KR | 100935495 | 1/2010 |
| KR | 20100006652 | 1/2010 |
| KR | 2010022327 | 3/2010 |
| KR | 20100039170 | 4/2010 |
| KR | 100958030 | 5/2010 |
| KR | 20100059681 | 6/2010 |
| KR | 20100070116 | 6/2010 |
| KR | 20100070119 | 6/2010 |
| KR | 20100072994 | 7/2010 |
| KR | 100977516 | 8/2010 |
| KR | 2010091758 | 8/2010 |
| KR | 20100089125 | 8/2010 |
| KR | 20100090521 | 8/2010 |
| KR | 20100091758 | 8/2010 |
| KR | 20100098958 | 9/2010 |
| KR | 100985816 | 10/2010 |
| KR | 100990904 | 11/2010 |
| KR | 20100123021 | 11/2010 |
| KR | 1006660 | 1/2011 |
| KR | 20110006437 | 1/2011 |
| KR | 20110011264 | 2/2011 |
| KR | 2011019994 | 3/2011 |
| KR | 2011024290 | 3/2011 |
| KR | 101111167 | 4/2011 |
| KR | 1111167 | 2/2012 |
| KR | 1020130142810 | 12/2013 |
| TW | 201116030 | 5/2011 |
| WO | WO 03/093963 | 11/2003 |
| WO | WO 2004/027459 | 4/2004 |
| WO | WO 2005/002228 | 1/2005 |
| WO | WO 2005/015143 | 2/2005 |
| WO | WO 2005/088846 | 9/2005 |
| WO | WO 2006/112866 | 10/2006 |
| WO | WO 2007/006242 | 1/2007 |
| WO | WO 2009/122114 | 10/2009 |
| WO | WO 2010/005152 | 1/2010 |
| WO | WO 2010/033142 | 3/2010 |
| WO | WO 2012/015965 | 2/2012 |

\* cited by examiner

INFRARED CAMERA SYSTEM HOUSING WITH METALIZED SURFACE

CROSS-REFERENCE TO RELATED APPLICATIONS

This application claims the benefit of U.S. Provisional Patent Application No. 61/683,124 filed Aug. 14, 2012 and entitled "INFRARED CAMERA SYSTEM HOUSING WITH METALIZED SURFACE" which is hereby incorporated by reference in its entirety.

This application is a continuation-in-part of International Patent Application No. PCT/US2012/041744 filed Jun. 8, 2012 and entitled "LOW POWER AND SMALL FORM FACTOR INFRARED IMAGING" which is hereby incorporated by reference in its entirety.

International Patent Application No. PCT/US2012/041744 claims the benefit of U.S. Provisional Patent Application No. 61/656,889 filed Jun. 7, 2012 and entitled "LOW POWER AND SMALL FORM FACTOR INFRARED IMAGING" which is hereby incorporated by reference in its entirety.

International Patent Application No. PCT/US2012/041744 claims the benefit of U.S. Provisional Patent Application No. 61/545,056 filed Oct. 7, 2011 and entitled "NON-UNIFORMITY CORRECTION TECHNIQUES FOR INFRARED IMAGING DEVICES" which is hereby incorporated by reference in its entirety.

International Patent Application No. PCT/US2012/041744 claims the benefit of U.S. Provisional Patent Application No. 61/495,873 filed Jun. 10, 2011 and entitled "INFRARED CAMERA PACKAGING SYSTEMS AND METHODS" which is hereby incorporated by reference in its entirety.

International Patent Application No. PCT/US2012/041744 claims the benefit of U.S. Provisional Patent Application No. 61/495,879 filed Jun. 10, 2011 and entitled "INFRARED CAMERA SYSTEM ARCHITECTURES" which is hereby incorporated by reference in its entirety.

International Patent Application No. PCT/US2012/041744 claims the benefit of U.S. Provisional Patent Application No. 61/495,888 filed Jun. 10, 2011 and entitled "INFRARED CAMERA CALIBRATION TECHNIQUES" which is hereby incorporated by reference in its entirety.

This application is a continuation-in-part of International Patent Application No. PCT/US2012/041749 filed Jun. 8, 2012 and entitled "NON-UNIFORMITY CORRECTION TECHNIQUES FOR INFRARED IMAGING DEVICES" which is hereby incorporated by reference in its entirety.

International Patent Application No. PCT/US2012/041749 claims the benefit of U.S. Provisional Patent Application No. 61/545,056 filed Oct. 7, 2011 and entitled "NON-UNIFORMITY CORRECTION TECHNIQUES FOR INFRARED IMAGING DEVICES" which is hereby incorporated by reference in its entirety.

International Patent Application No. PCT/US2012/041749 claims the benefit of U.S. Provisional Patent Application No. 61/495,873 filed Jun. 10, 2011 and entitled "INFRARED CAMERA PACKAGING SYSTEMS AND METHODS" which is hereby incorporated by reference in its entirety.

International Patent Application No. PCT/US2012/041749 claims the benefit of U.S. Provisional Patent Application No. 61/495,879 filed Jun. 10, 2011 and entitled "INFRARED CAMERA SYSTEM ARCHITECTURES" which is hereby incorporated by reference in its entirety.

International Patent Application No. PCT/US2012/041749 claims the benefit of U.S. Provisional Patent Application No. 61/495,888 filed Jun. 10, 2011 and entitled "INFRARED CAMERA CALIBRATION TECHNIQUES" which is hereby incorporated by reference in its entirety.

This application is a continuation-in-part of International Patent Application No. PCT/US2012/041739 filed Jun. 8, 2012 and entitled "INFRARED CAMERA SYSTEM ARCHITECTURES" which is hereby incorporated by reference in its entirety.

International Patent Application No. PCT/US2012/041739 claims the benefit of U.S. Provisional Patent Application No. 61/495,873 filed Jun. 10, 2011 and entitled "INFRARED CAMERA PACKAGING SYSTEMS AND METHODS" which is hereby incorporated by reference in its entirety.

International Patent Application No. PCT/US2012/041739 claims the benefit of U.S. Provisional Patent Application No. 61/495,879 filed Jun. 10, 2011 and entitled "INFRARED CAMERA SYSTEM ARCHITECTURES" which is hereby incorporated by reference in its entirety.

International Patent Application No. PCT/US2012/041739 claims the benefit of U.S. Provisional Patent Application No. 61/495,888 filed Jun. 10, 2011 and entitled "INFRARED CAMERA CALIBRATION TECHNIQUES" which is hereby incorporated by reference in its entirety.

TECHNICAL FIELD

One or more embodiments of the invention relate generally to imaging devices and more particularly, for example, to infrared imaging devices.

BACKGROUND

Existing infrared imaging devices, such as infrared cameras, are often subject to environmental conditions which may adversely affect their performance. For example, undesired radiation may reduce thermographic accuracy and may introduce low spatial frequency non-uniformities.

In particular, radiation received from outside a field of view (e.g., outside a target scene desired to be imaged) or non-uniform heating (e.g., by external sources or components of such devices) may significantly degrade the accuracy and uniformity of such devices. These effects can become especially significant for infrared imaging devices implemented with small form factors.

SUMMARY

In accordance with various embodiments of the disclosure, a housing for an infrared camera module may be implemented with a substantially non-metal cover configured to substantially or completely enclose various components of an infrared imaging device. A metal layer may be disposed on various interior and/or exterior surfaces of the cover. Such implementations may be used to reduce the effects of various environmental conditions which may otherwise adversely affect the performance of the infrared imaging device. In addition, one or more conductive traces (e.g., electrical connections) may be built into the housing and/or on various surfaces of the housing to facilitate the passing of signals from components of the infrared imaging device such as infrared sensors, read out circuitry, a temperature measurement component, and/or other components. One or more fiducial markers may be provided to align various components of the infrared camera module during manufacture. These and other features and advantages will be further described herein.

In one embodiment, an apparatus includes a housing adapted to at least substantially enclose an infrared sensor assembly and comprising: a substantially non-metal cover; and a metal layer disposed on a majority of interior and/or exterior surfaces of the cover.

In another embodiment, a method includes providing a substantially non-metal cover; metalizing a majority of interior and/or exterior surfaces of the cover to provide a metal layer; wherein the cover and the metal layer comprise a housing; and wherein the housing is adapted to at least substantially enclose an infrared sensor assembly In another embodiment, a system includes an infrared camera module comprising: an infrared sensor assembly adapted to capture image frames; and a housing at least substantially enclosing the infrared sensor assembly and comprising: a substantially non-metal cover, and a metal layer disposed on a majority of interior and/or exterior surfaces of the cover.

In another embodiment, an apparatus includes a housing comprising: a substantially non-metal cover; a metal layer on a majority of interior and/or exterior surfaces of the cover; wherein the housing is adapted to at least substantially enclose an infrared sensor assembly; and wherein the housing is adapted to engage with a socket of a mobile personal electronic device.

In another embodiment, an apparatus includes a housing implemented as a molded interconnect device (MID) adapted to at least substantially enclose an infrared sensor assembly, the housing comprising a conductive trace; and a temperature measurement component mounted on an interior surface of the housing, electrically connected to the conductive trace, and adapted to be used to determine a temperature associated with the housing.

The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

FIGS. 5F-P illustrate additional views of infrared imaging modules implemented with several form factors in accordance with various embodiments of the disclosure.

Embodiments of the invention and their advantages are best understood by referring to the detailed description that follows. It should be appreciated that like reference numerals are used to identify like elements illustrated in one or more of the figures.

DETAILED DESCRIPTION

Figure 1:
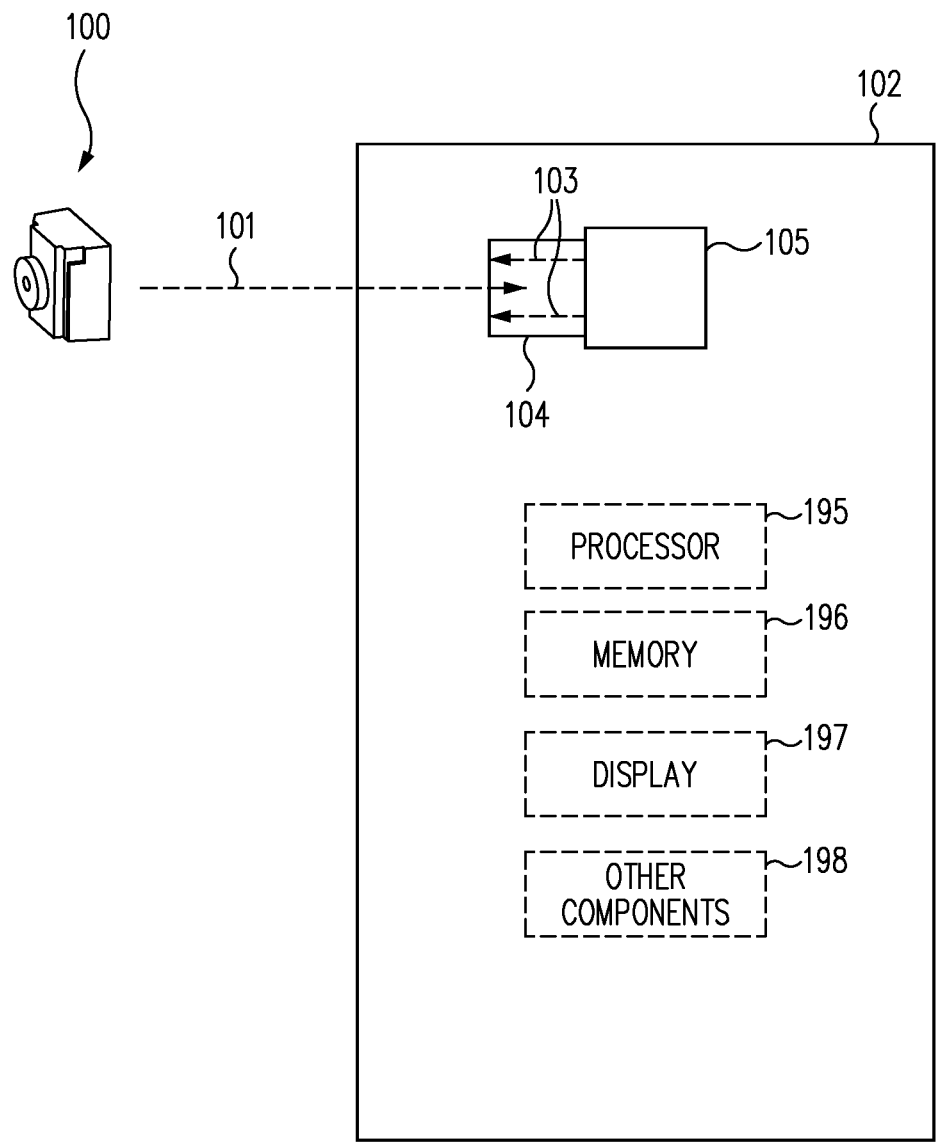
FIG. 1 illustrates an infrared imaging module configured to be implemented in a host device in accordance with an embodiment of the disclosure.

FIG. 1 illustrates an infrared imaging module 100 (e.g., an infrared camera or an infrared imaging device) configured to be implemented in a host device 102 in accordance with an embodiment of the disclosure. Infrared imaging module 100 may be implemented, for one or more embodiments, with a small form factor and in accordance with wafer level packaging techniques along with other novel infrared camera packaging techniques as discussed herein.

In one embodiment, infrared imaging module 100 may be configured to be implemented in a small portable host device 102, such as a mobile telephone, a tablet computing device, a laptop computing device, a personal digital assistant, a visible light camera, a music player, or any other appropriate device. In this regard, infrared imaging module 100 may be used to provide infrared imaging features to host device 102. For example, infrared imaging module 100 may be configured to capture, process, and/or otherwise manage infrared images and provide such infrared images to host device 102 for use in any desired fashion (e.g., for further processing, to store in memory, to display, to use by various applications running on host device 102, to export to other devices, or other uses).

In various embodiments, infrared imaging module 100 may be configured to operate at low voltage levels and over a wide temperature range. For example, in one embodiment, infrared imaging module 100 may operate using a power supply of approximately 2.4 volts, 2.5 volts, 2.8 volts, or lower voltages, and operate over a temperature range of approximately −20 degrees C. to approximately +60 degrees C. (e.g., providing a suitable dynamic range and performance over approximately 80 degrees C.). In one embodiment, by operating infrared imaging module 100 at low voltage levels, infrared imaging module 100 may experience reduced amounts of self heating in comparison with other types of infrared imaging devices. As a result, infrared imaging module 100 may be operated without requiring significant additional measures to compensate for such self heating.

Figure 2:
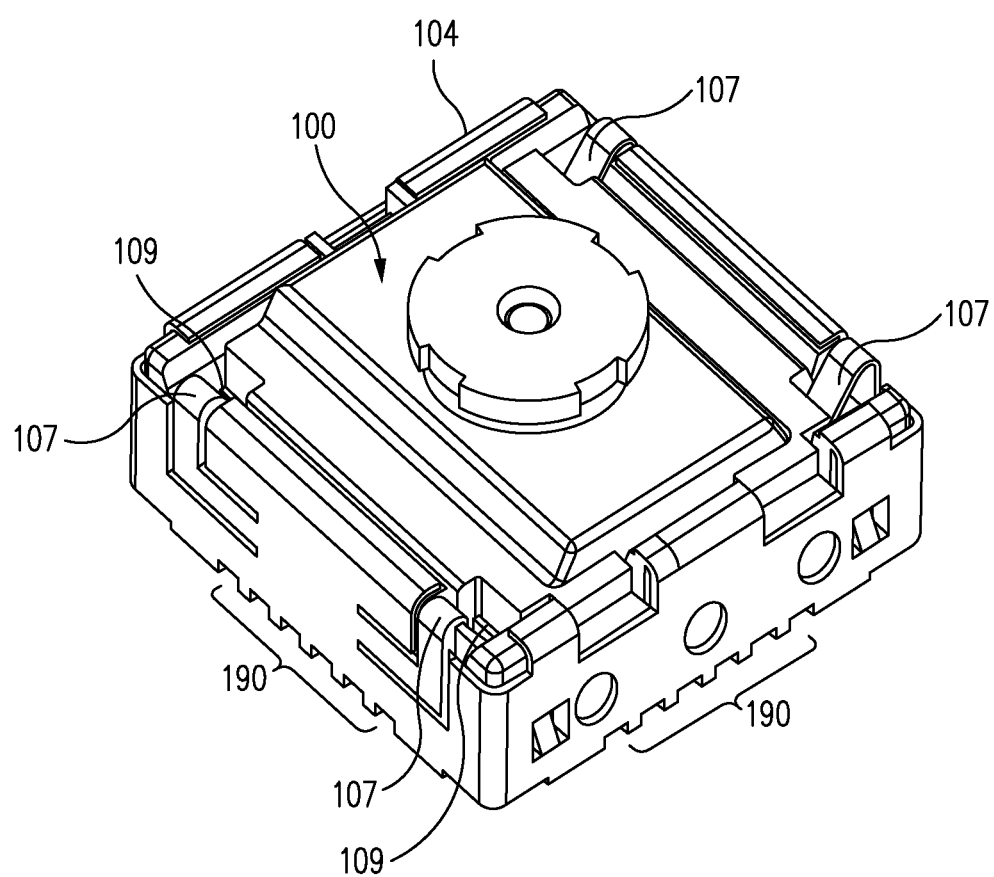
FIG. 2 illustrates an assembled infrared imaging module in accordance with an embodiment of the disclosure.

As shown in FIG. 1, host device 102 may include a socket 104, a shutter 105, a processor 195, a memory 196, a display 197, and/or other components 198. Socket 104 may be configured to receive infrared imaging module 100 as identified by arrow 101. In this regard, FIG. 2 illustrates infrared imaging module 100 assembled in socket 104 in accordance with an embodiment of the disclosure.

Processor 195 may be implemented as any appropriate processing device (e.g., logic device, microcontroller, processor, application specific integrated circuit (ASIC), or other device) that may be used by host device 102 to execute appropriate instructions, such as software instructions provided in memory 196. Display 197 may be used to display captured and/or processed infrared images and/or other images, data, and information. Other components 198 may be used to implement any features of host device 102 as may be desired for various applications (e.g., a visible light camera or other components).

In various embodiments, infrared imaging module 100 and socket 104 may be implemented for mass production to facilitate high volume applications, such as for implementation in mobile telephones or other devices (e.g., requiring small form factors). In one embodiment, the combination of infrared imaging module 100 and socket 104 may exhibit overall dimensions of approximately 8.5 mm by 8.5 mm by 5.9 mm while infrared imaging module 100 is installed in socket 104.

Figure 3:
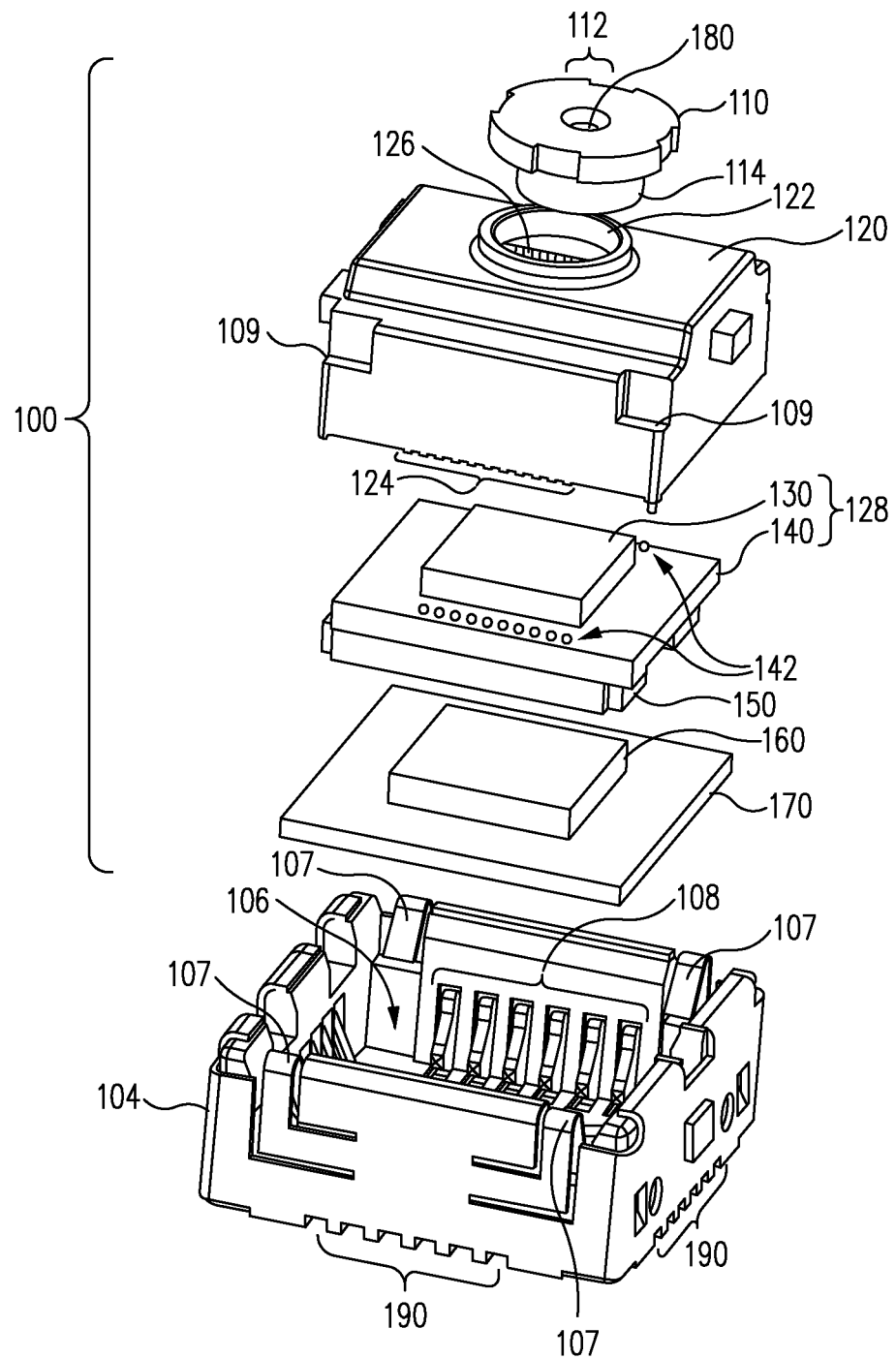
FIG. 3 illustrates an exploded view of an infrared imaging module juxtaposed over a socket in accordance with an embodiment of the disclosure.

FIG. 3 illustrates an exploded view of infrared imaging module 100 juxtaposed over socket 104 in accordance with an embodiment of the disclosure. Infrared imaging module 100 may include a lens barrel 110, a housing 120, an infrared sensor assembly 128, a circuit board 170, a base 150, and a processing module 160.

Lens barrel 110 may at least partially enclose an optical element 180 which is partially visible in FIG. 3 through an aperture 112 in lens barrel 110. Lens barrel 100 may include a substantially cylindrical extension 114 which may be used to interface lens barrel 100 with an aperture 122 in housing 120.

Infrared sensor assembly 128 may be implemented, for example, with a cap 130 (e.g., a lid) mounted on a substrate 140. Infrared sensor assembly 128 may include a plurality of infrared sensors 132 (e.g., infrared detectors) implemented in an array or other fashion on substrate 140 and covered by cap 130 (e.g., shown in FIGS. 5A-K, 5M-P, and 8). For example, in one embodiment, infrared sensor assembly 128 may be implemented as a focal plane array (FPA). Such a focal plane array may be implemented, for example, as a vacuum package assembly (e.g., sealed by cap 130 and substrate 140). In one embodiment, infrared sensor assembly 128 may be implemented as a wafer level package (e.g., infrared sensor assembly 128 may be singulated from a set of vacuum package assemblies provided on a wafer). In one embodiment, infrared sensor assembly 128 may be implemented to operate using a power supply of approximately 2.4 volts, 2.5 volts, 2.8 volts, or similar voltages. In various embodiments, infrared sensor assembly 128 may be implemented with infrared sensors 132 and any other components as desired.

Infrared sensors 132 may be configured to detect infrared radiation (e.g., infrared energy) from a target scene including, for example, mid wave infrared wave bands (MWIR), long wave infrared wave bands (LWIR), and/or other thermal imaging bands as may be desired in particular implementations. In one embodiment, infrared sensor assembly 128 may be provided in accordance with wafer level packaging techniques.

Infrared sensors 132 may be implemented, for example, as microbolometers or other types of thermal imaging infrared sensors arranged in any desired array pattern to provide a plurality of pixels. In one embodiment, infrared sensors 132 may be implemented as vanadium oxide (VOx) detectors with a 17 μm pixel pitch. In various embodiments, arrays of approximately 32 by 32 infrared sensors 132, approximately 64 by 64 infrared sensors 132, approximately 80 by 64 infrared sensors 132, or other array sizes may be used.

Figure 5A:
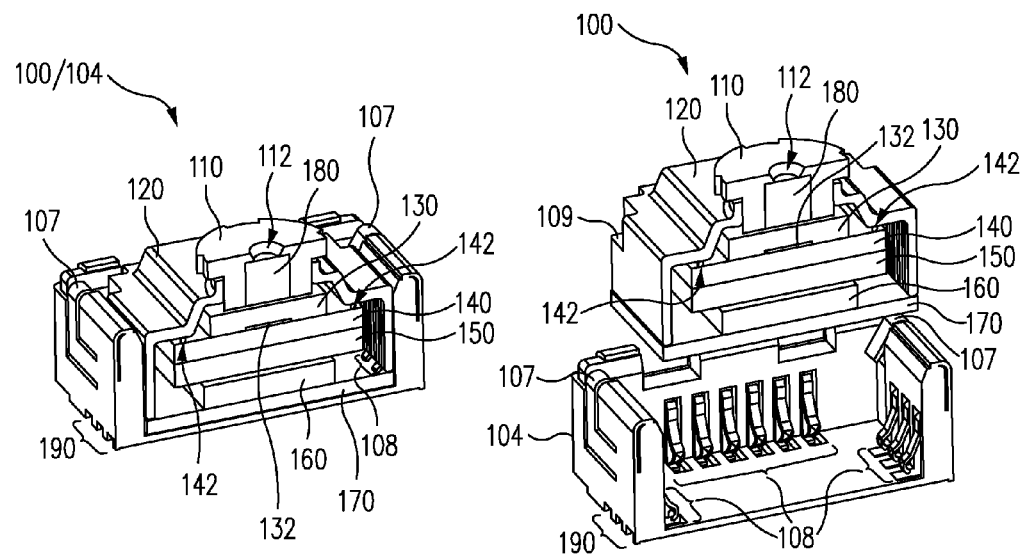
FIGS. 5A-E illustrate cross-sectional views of infrared imaging modules implemented with several form factors in accordance with various embodiments of the disclosure.

Substrate 140 may include various circuitry including, for example, a read out integrated circuit (ROIC) with dimensions less than approximately 5.5 mm by 5.5 mm in one embodiment. Substrate 140 may also include bond pads 142 that may be used to contact complementary connections positioned on inside surfaces of housing 120 when infrared imaging module 100 is assembled as shown in FIGS. 5A, 53, and 5C. In one embodiment, the ROIC may be implemented with low-dropout regulators (LDO) to perform voltage regulation to reduce power supply noise introduced to infrared sensor assembly 128 and thus provide an improved power supply rejection ratio (PSRR). Moreover, by implementing the LDO with the ROIC (e.g., within a wafer level package), less die area may be consumed and fewer discrete die (or chips) are needed.

Infrared sensor assembly 128 may capture images (e.g., image frames) and provide such images from its ROIC at various rates. Processing module 160 may be used to perform appropriate processing of captured infrared images and may be implemented in accordance with any appropriate architecture. In one embodiment, processing module 160 may be implemented as an ASIC. In this regard, such an ASIC may be configured to perform image processing with high performance and/or high efficiency. In another embodiment, processing module 160 may be implemented with a general purpose central processing unit (CPU) which may be configured to execute appropriate software instructions to perform image processing, coordinate and perform image processing with various image processing blocks, coordinate interfacing between processing module 160 and host device 102, and/or other operations. In yet another embodiment, processing module 160 may be implemented with a field programmable gate array (FPGA). Processing module 160 may be implemented with other types of processing and/or logic circuits in other embodiments as would be understood by one skilled in the art.

In these and other embodiments, processing module 160 may also be implemented with other components where appropriate, such as, volatile memory, non-volatile memory, and/or one or more interfaces (e.g., infrared detector interfaces, inter-integrated circuit (I2C) interfaces, mobile industry processor interfaces (MIPI), joint test action group (JTAG) interfaces (e.g., IEEE 1149.1 standard test access port and boundary-scan architecture), and/or other interfaces).

When infrared imaging module 100 is assembled, housing 120 may substantially enclose infrared sensor assembly 128, base 150, and processing module 160. Housing 120 may facilitate connection of various components of infrared imaging module 100. For example, in one embodiment, housing 120 may provide electrical connections 126 to connect various components as further described.

Electrical connections 126 (e.g., conductive electrical paths, conductive traces, or other types of connections) may be electrically connected with bond pads 142 when infrared imaging module 100 is assembled. In various embodiments, electrical connections 126 may be embedded in housing 120, provided on inside surfaces of housing 120, and/or otherwise provided by housing 120. Electrical connections 126 may terminate in connections 124 protruding from the bottom surface of housing 120 as shown in FIG. 3. Connections 124 may connect with circuit board 170 when infrared imaging module 100 is assembled (e.g., housing 120 may rest atop circuit board 170 as shown in FIGS. 5A-C and FIGS. 5F-I). Processing module 160 may be electrically connected with circuit board 170 through appropriate electrical connections. As a result, infrared sensor assembly 128 may be electrically connected with processing module 160 through, for example, conductive electrical paths provided by: bond pads 142, complementary connections on inside surfaces of housing 120, electrical connections 126 of housing 120, connections 124, and circuit board 170. Advantageously, such an arrangement may be implemented without requiring wire bonds to be provided between infrared sensor assembly 128 and processing module 160.

In various embodiments, electrical connections 126 in housing 120 may be made from any desired material (e.g., copper or any other appropriate conductive material). In one embodiment, electrical connections 126 may aid in dissipating heat from infrared imaging module 100.

Substrate 140 of infrared sensor assembly 128 may be mounted on base 150. In various embodiments, base 150 (e.g., a pedestal) may be made, for example, of copper formed by metal injection molding (MIM) and provided with a black oxide or nickel-coated finish. In various embodiments, base 150 may be made of any desired material, such as for example zinc, aluminum, or magnesium, as desired for a given application and may be formed by any desired applicable process, such as for example aluminum casting, MIM, or zinc rapid casting, as may be desired for particular applications. In various embodiments, base 150 may be implemented to provide structural support, various circuit paths, thermal heat sink properties, and other features where appropriate. In one embodiment, base 150 may be a multi-layer structure implemented at least in part using ceramic material.

In various embodiments, circuit board 170 may receive housing 120 and thus may physically support the various components of infrared imaging module 100. In various embodiments, circuit board 170 may be implemented as a printed circuit board (e.g., an FR4 circuit board or other types of circuit boards), a rigid or flexible interconnect (e.g., tape or other type of interconnects), a flexible circuit substrate, a flexible plastic substrate, or other appropriate structures. In various embodiments, base 150 may be implemented with the various features and attributes described for circuit board 170, and vice versa.

Socket 104 may include a cavity 106 configured to receive infrared imaging module 100 (e.g., as shown in the assembled view of FIG. 2). Infrared imaging module 100 and/or socket 104 may include appropriate tabs, arms, pins, fasteners, or any other appropriate engagement members which may be used to secure infrared imaging module 100 to or within socket 104 using friction, tension, adhesion, and/or any other appropriate manner. For example, as shown in FIGS. 2-3, 5A-F, 5H, 5J, 5L-M, and 5O-P, socket 104 may include engagement members 107 that may engage surfaces 109 of housing 120 when infrared imaging module 100 is inserted into a cavity 106 of socket 104. Other types of engagement members may be used in other embodiments.

Infrared imaging module 100 may be electrically connected with socket 104 through appropriate electrical connections (e.g., contacts, pins, wires, or any other appropriate connections). For example, as shown in FIGS. 3 and 5A-P, socket 104 may include electrical connections 108 which may contact corresponding electrical connections of infrared imaging module 100 (e.g., interconnect pads, contacts, or other electrical connections on side or bottom surfaces of circuit board 170, bond pads 142 or other electrical connections on base 150, or other connections). Electrical connections 108 may be made from any desired material (e.g., copper or any other appropriate conductive material). In one embodiment, electrical connections 108 may be mechanically biased to press against electrical connections of infrared imaging module 100 when infrared imaging module 100 is inserted into cavity 106 of socket 104. In one embodiment, electrical connections 108 may at least partially secure infrared imaging module 100 in socket 104. Other types of electrical connections may be used in other embodiments.

Socket 104 may be electrically connected with host device 102 through similar types of electrical connections. For example, in one embodiment, host device 102 may include electrical connections (e.g., soldered connections, snap-in connections, or other connections) that connect with electrical connections 108 passing through apertures 190 as shown in FIGS. 2-3 and 5A-P. In various embodiments, such electrical connections may be made to the sides and/or bottom of socket 104.

Various components of infrared imaging module 100 may be implemented with flip chip technology which may be used to mount components directly to circuit boards without the additional clearances typically needed for wire bond connections. Flip chip connections may be used, as an example, to reduce the overall size of infrared imaging module 100 for use in compact small form factor applications. For example, in one embodiment, processing module 160 may be mounted to circuit board 170 using flip chip connections. For example, in FIGS. 5A-C, 5F-I, and 5L (further described herein), infrared imaging module 100 may be implemented with such flip chip configurations.

In various embodiments, infrared imaging module 100 and/or associated components may be implemented in accordance with various techniques (e.g., wafer level packaging techniques) as set forth in U.S. patent application Ser. No. 12/844,124 filed Jul. 27, 2010, and U.S. Provisional Patent Application No. 61/469,651 filed Mar. 30, 2011, which are incorporated herein by reference in their entirety. Furthermore, in accordance with one or more embodiments, infrared imaging module 100 and/or associated components may be implemented, calibrated, tested, and/or used in accordance with various techniques, such as for example as set forth in U.S. Pat. No. 7,470,902 issued Dec. 30, 2008, U.S. Pat. No. 6,028,309 issued Feb. 22, 2000, U.S. Pat. No. 6,812,465 issued Nov. 2, 2004, U.S. Pat. No. 7,034,301 issued Apr. 25, 2006, U.S. Pat. No. 7,679,048 issued Mar. 16, 2010, U.S. Pat. No. 7,470,904 issued Dec. 30, 2008, U.S. patent application Ser. No. 12/202,880 filed Sep. 2, 2008, and U.S. patent application Ser. No. 12/202,896 filed Sep. 2, 2008, which are incorporated herein by reference in their entirety.

Figure 4:
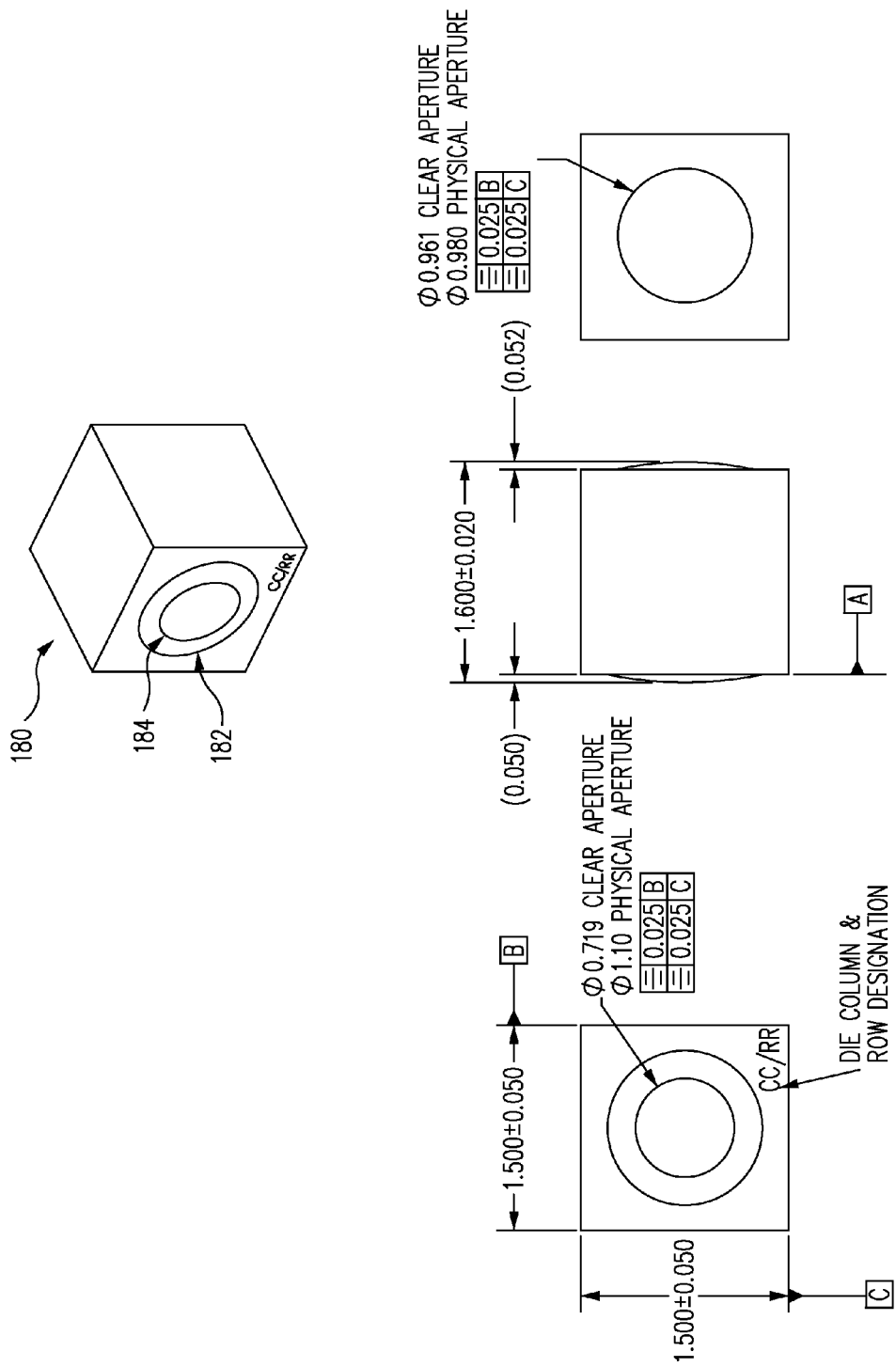
FIG. 4 illustrates an example implementation of an optical element that may be implemented in an infrared imaging module in accordance with an embodiment of the disclosure.

FIG. 4 illustrates an example implementation of optical element 180 that may be implemented in infrared imaging module 100 in accordance with an embodiment of the disclosure. In one embodiment, optical element 180 may be implemented as a silicon etched wafer level single element optic in accordance with various dimensions shown in FIG. 4.

As also shown in FIG. 4, optical element 180 may be implemented substantially as a cube, but with two slightly convex faces on faces providing apertures. For example, optical element 180 may include a physical aperture 182 and a smaller clear aperture 184. Optical element 180 allows through the desired infrared wavelengths to infrared sensor assembly 128.

In one embodiment, optical element 180 may be a single etched wafer level optical element made of silicon with the following specifications: image plane of 0.54 mm by 0.54 mm (e.g., when implemented for an infrared sensor assembly 128 having a 32 by 32 array of infrared sensors 132 with 17 µm pixel pitch); horizontal field of view (FoV) of approximately 55.7 degrees; F/# approximately equal to 0.91; modulated transfer function (MTF) of approximately 0.46 at 29 cy/mm; an anti-reflective coating with less than approximately two percent loss per surface; and focused at infinity.

In some embodiments, optical element 180 may be integrated as part of a wafer level package that includes infrared sensor assembly 128. For example, optical element 180 may be implemented as part of cap 130, stacked on various components of infrared sensor assembly 128 (e.g., with appropriate spacers provided therebetween), or otherwise integrated with various components of infrared sensor assembly 128.

Referring again to FIG. 1, in various embodiments, host device 102 may include shutter 105. In this regard, shutter 105 may be selectively positioned over socket 104 (e.g., as identified by arrows 103) while infrared imaging module 100 is installed therein. In this regard, shutter 105 may be used, for example, to protect infrared imaging module 100 when not in use. Shutter 105 may also be used as a temperature reference as part of a calibration process (e.g., a non-uniformity correction (NUC) process or other calibration processes) for infrared imaging module 100 as would be understood by one skilled in the art.

In various embodiments, shutter 105 may be made from various materials such as, for example, polymers, glass, or other materials. In various embodiments, shutter 105 may include one or more coatings to selectively filter electromagnetic radiation and/or adjust various optical properties of shutter 105 (e.g., a uniform blackbody coating or a reflective gold coating).

In another embodiment, shutter 105 may be fixed in place to protect infrared imaging module 100 at all times. In this case, shutter 105 or a portion of shutter 105 may be made from appropriate materials (e.g., polymers) that do not substantially filter desired infrared wavelengths. In another embodiment, a shutter may be implemented as part of infrared imaging module 100 (e.g., within or as part of a lens barrel or other components of infrared imaging module 100), as would be understood by one skilled in the art. Alternatively, in another embodiment, a shutter (e.g., shutter 105 or other type of external or internal shutter) need not be provided, but rather a NUC process or other type of calibration may be performed using shutterless techniques.

FIGS. 5A-E illustrate cross-sectional views of infrared imaging modules 100 implemented with several form factors in accordance with various embodiments of the disclosure. In particular, each of FIGS. 5A-E shows a cross-sectional view of an infrared imaging module 100 while installed in a corresponding socket 104, and another cross-sectional view of the same infrared imaging module 100 but separated from its corresponding socket 104.

It will be appreciated that FIGS. 5A-E show a variety of physical implementations of various components identified in FIGS. 1-4. For example, FIG. 5A shows a physical implementation of infrared imaging module 100 and socket 104 corresponding to the embodiments illustrated in FIGS. 2-3, while FIGS. 5B-E show other examples of physical implementations.

Figure 5B:
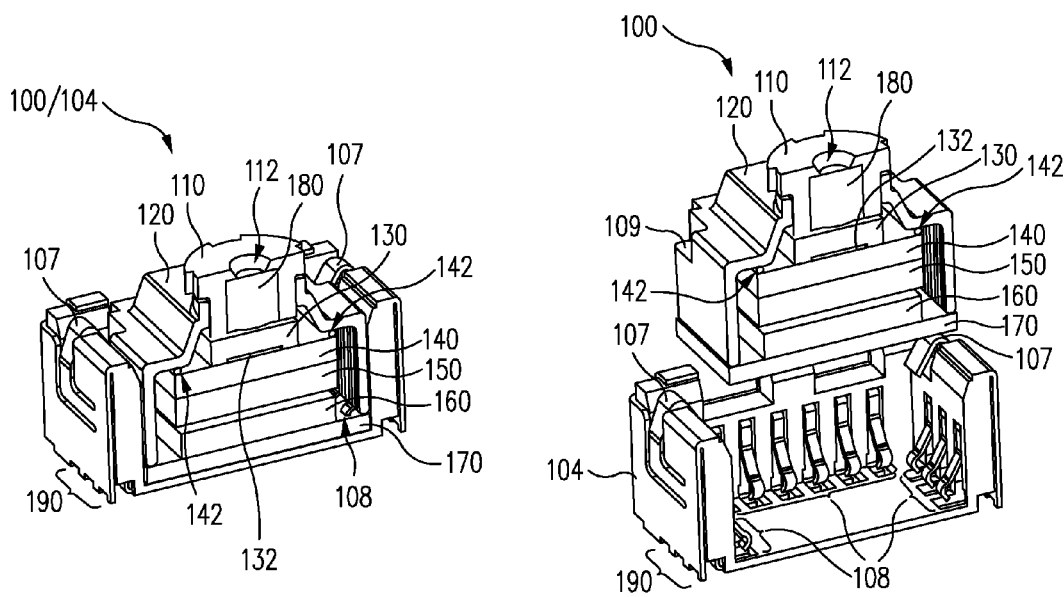
Figure 5C:
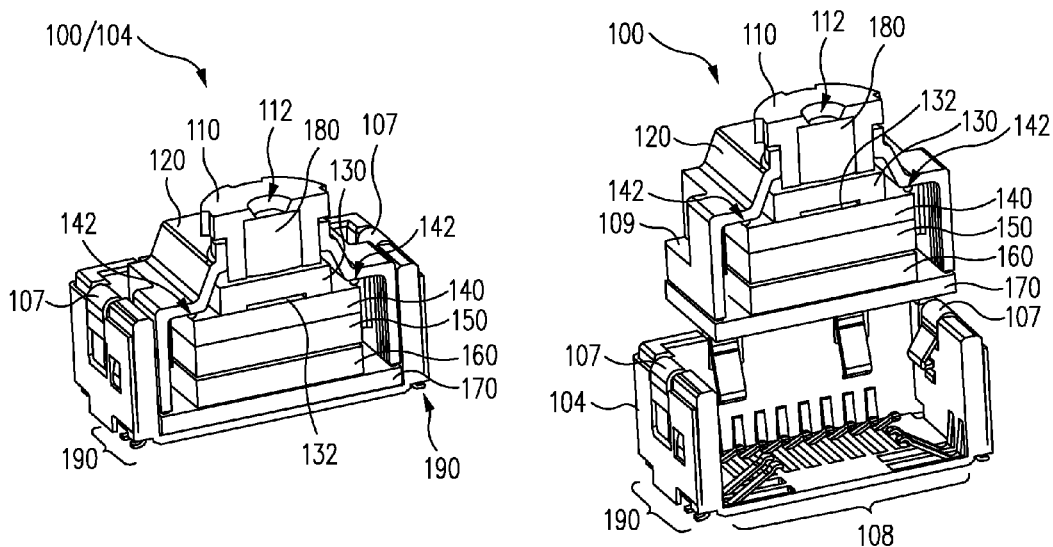

It will also be appreciated that, in FIGS. 5A-C, electrical connections 126 may be provided in housing 120 as discussed to infrared sensor assembly 128 and circuit board 170. In contrast, in FIGS. 5D-E, wire bonds 143 and 145 may be used to connect infrared sensor assembly 128 to processing module 160. In one embodiment, wire bonds 143 and 145 may pass through base 150. In another embodiment, wire bonds 143 and 145 may connect to circuitry in base 150 without passing through base 150. In yet another embodiment, wire bonds 143 and 145 may connect to electrical connections 147 to provide electrical connections between various portions of infrared imaging module 100 to socket 104 and/or host device 102.

In some embodiments, sockets 104 shown in FIGS. 5A-E may be implemented as mobile telephone camera sockets available from, for example, Molex® Incorporated of Lisle, Ill. in accordance with various part numbers identified in Table 1 below. Table 1 further identifies various example aspects of sockets 104 shown in FIGS. 5A-E.

TABLE 1

Figure 5D:
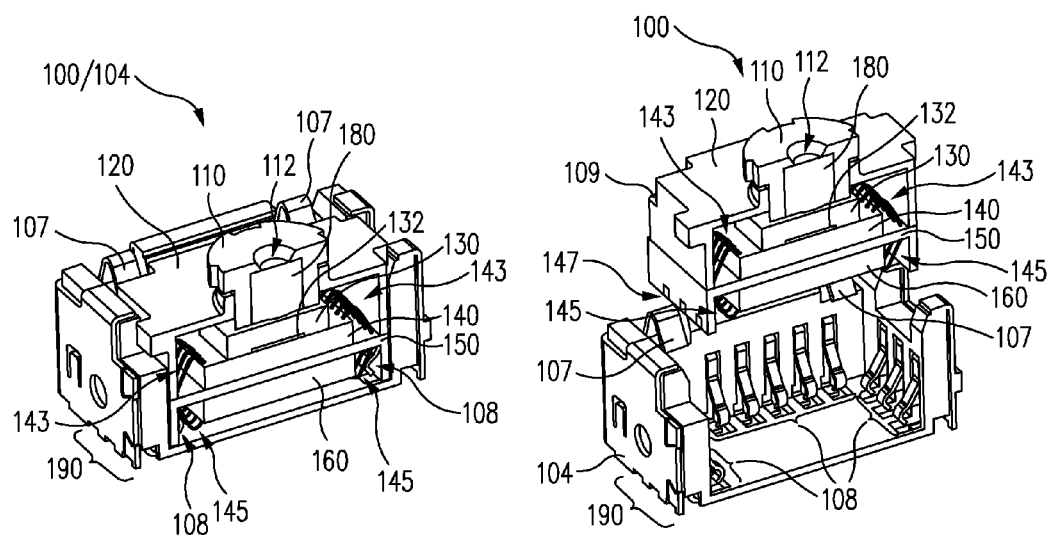
Figure 5E:
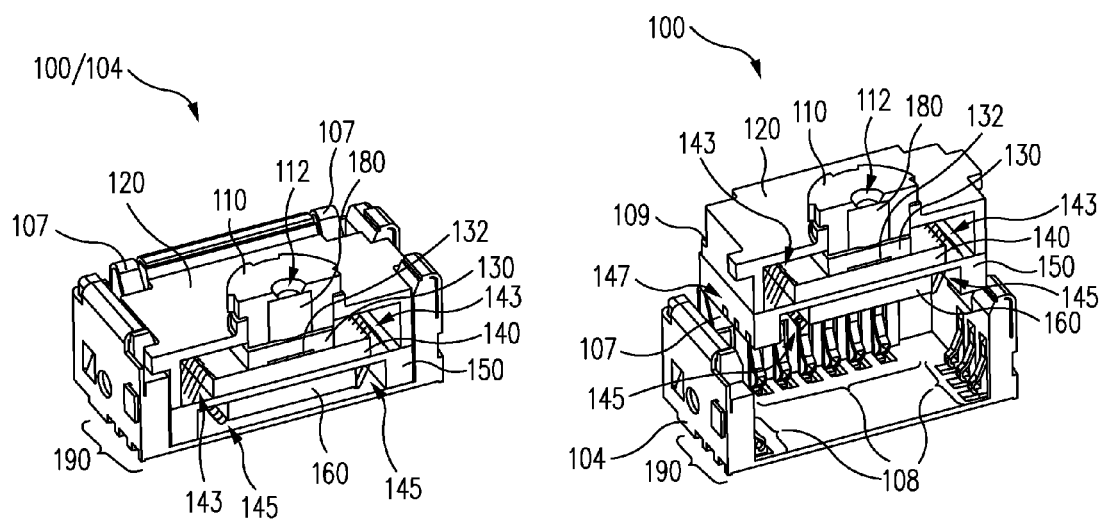

| | Internal Socket Size L × W (mm) | Socket Type | Part Number | Frame | Board | Overall Package Dimensions L × W × H (mm) | Camera Sub Assembly Dimensions L × W × H (mm) | Sensor Size (mm) | Window Size (mm) | Frame Thickness (mm) |
|---|---|---|---|---|---|---|---|---|---|---|
| FIG. 5A | 8.50 × 8.50 | Side Contact | SD-47337-001 | LDS-MID | PCB | 10.60 × 10.60 × 5.90 | 8.50 × 8.50 × 5.65 | 6.5 × 7.5 | 4.0 × 4.0 | 0.300 |
| FIG. 5B | 6.50 × 6.50 | Side Contact | SD-47586-001 | LDS-MID | PCB | 8.60 × 8.60 × 5.90 | 6.50 × 6.50 × 5.65 | 5.0 × 5.5 | 3.0 × 3.0 | 0.100 – 0.250 |
| FIG. 5C | 6.50 × 6.50 | Bottom Contact | SD-78499-001 | LDS-MID | PCB | 8.00 × 8.00 × 5.80 | 6.50 × 6.50 × 5.55 | 4.8 × 5.7 | 3.0 × 3.0 | 0.100 – 0.250 |
| FIG. 5D | 6.50 × 6.50 | Side Contact | SD-47586-001 | LCP | Ceramic | 8.60 × 8.60 × 5.00 | 6.50 × 6.50 × 4.75 | 4.4 × 5.3 | 3.0 × 3.0 | 0.250 |
| FIG. 5E | 8.50 × 8.50 | Side Contact | SD-47337-001 | LCP | Ceramic | 10.60 × 10.60 × 5.00 | 8.50 × 8.50 × 4.75 | 5.5 × 5.5 | 4.0 × 4.0 | 0.400 |

Figure 5F:
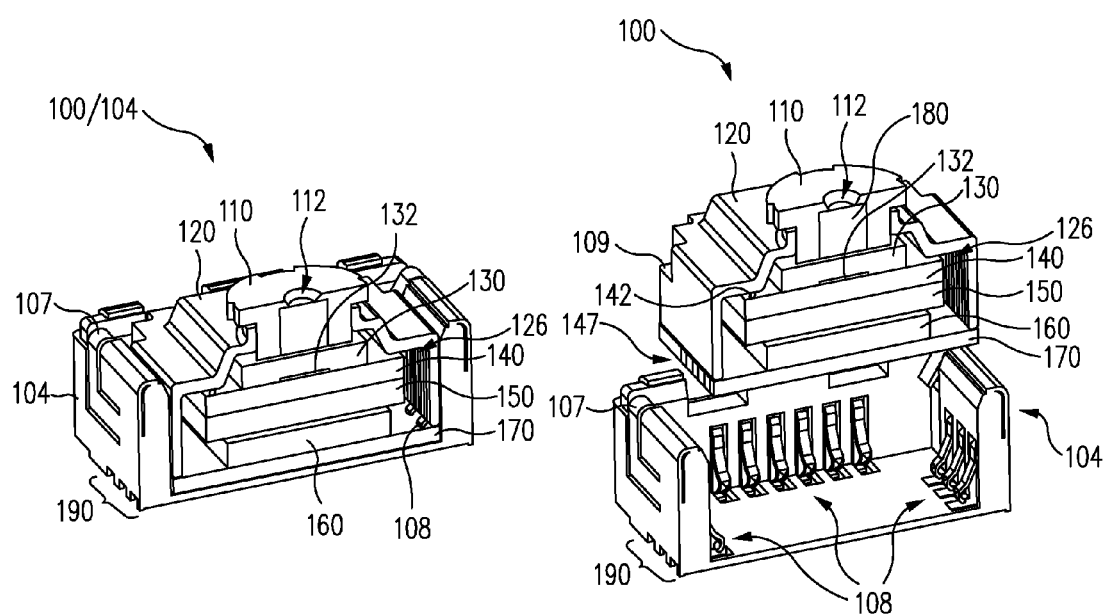
Figure 5G:
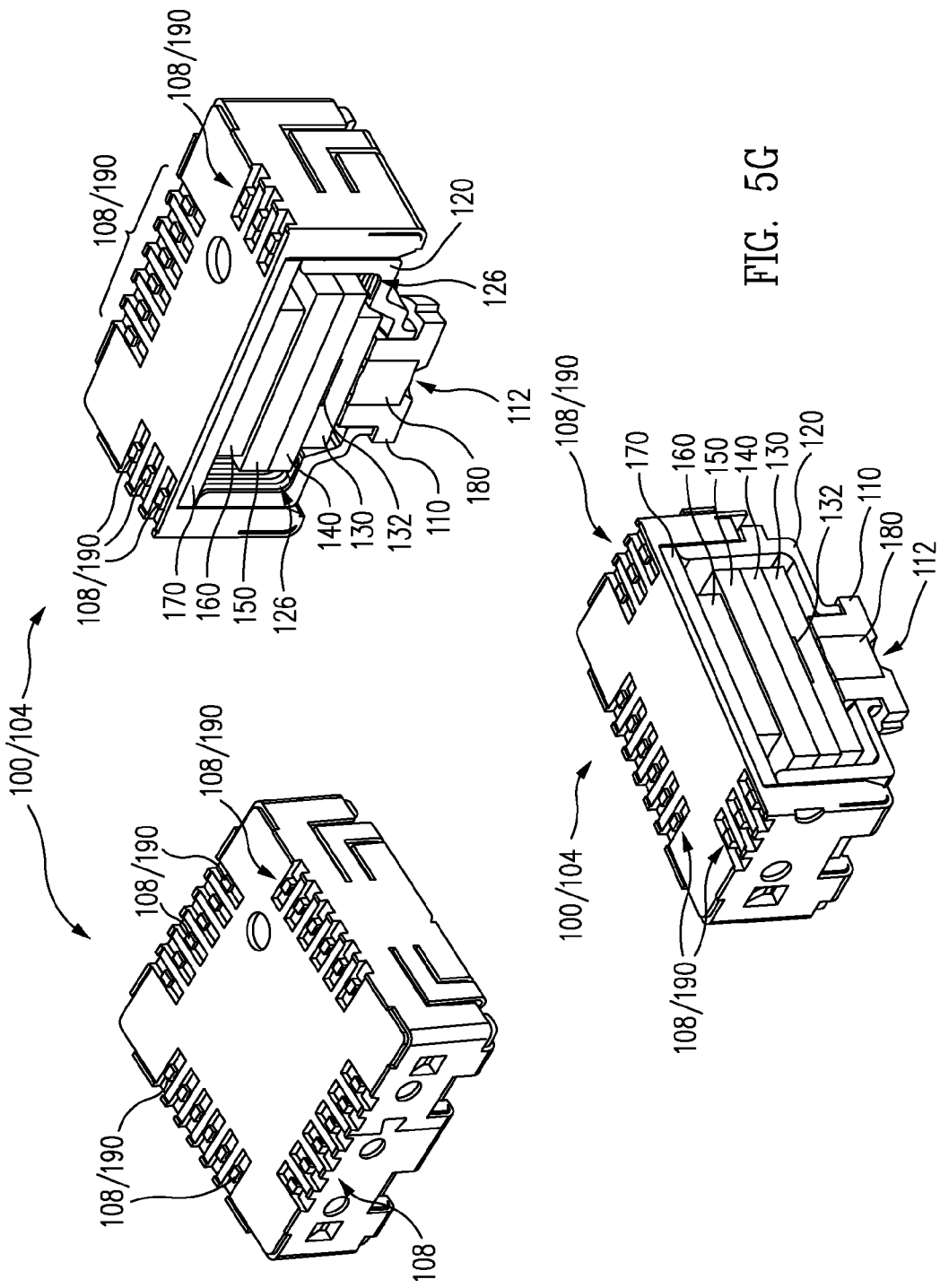
Figure 5H:
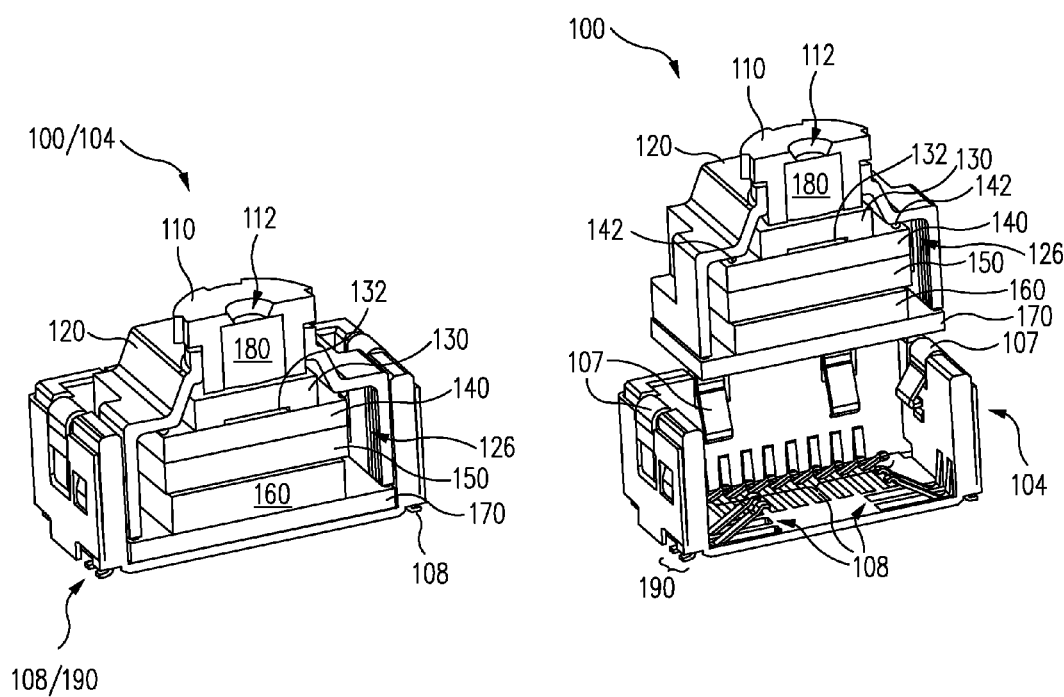
Figure 5I:
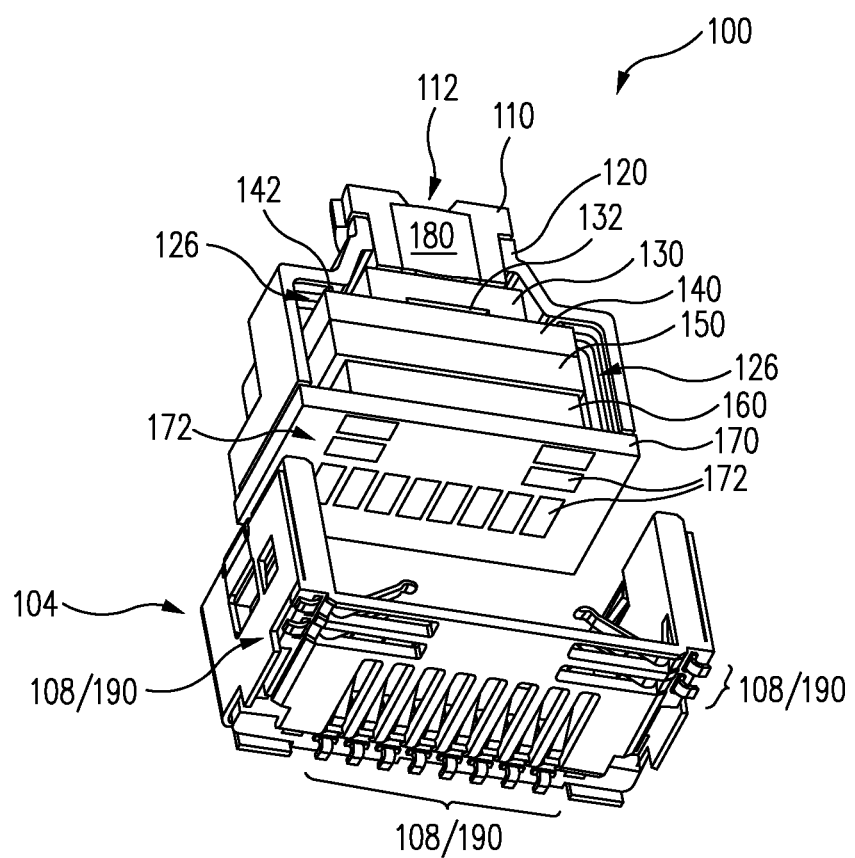
Figure 5J:
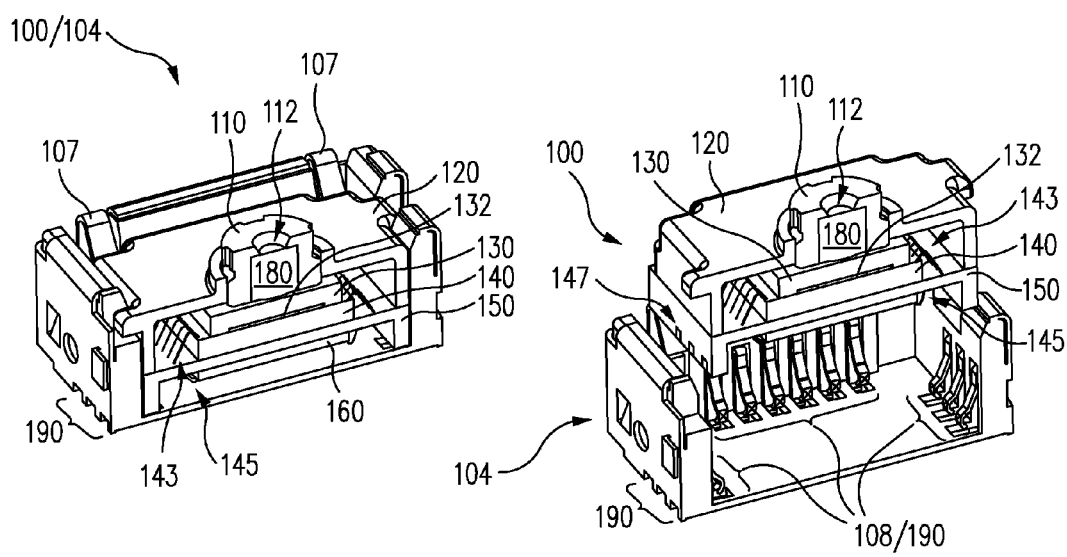
Figure 5K:
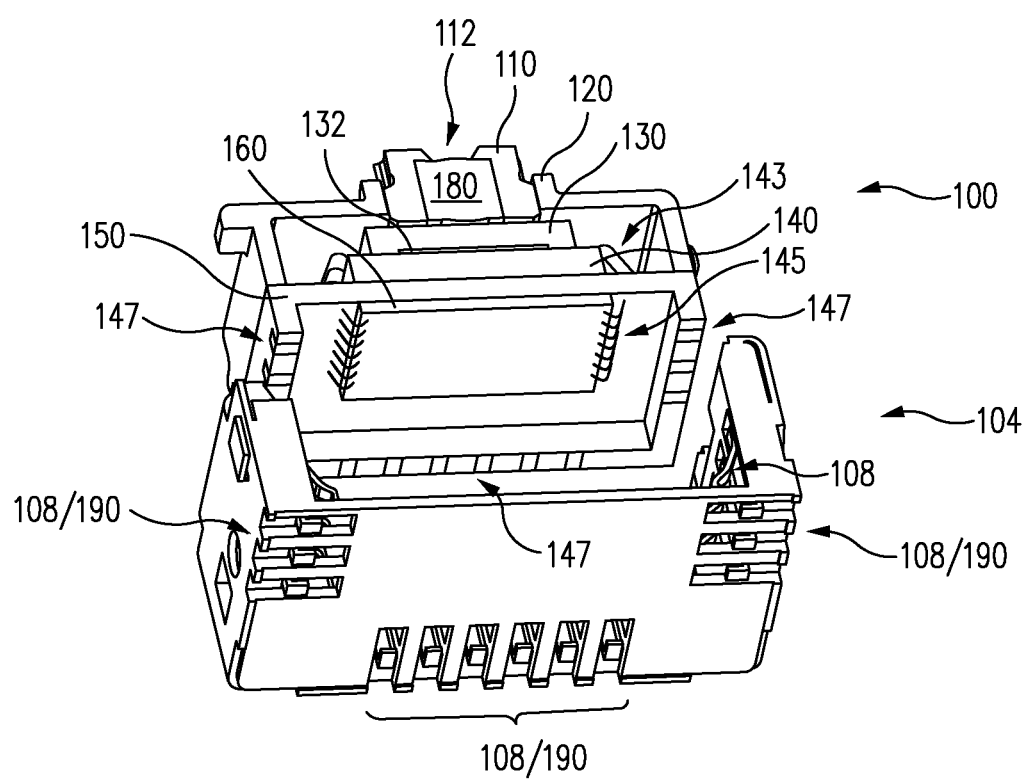
Figure 5L:
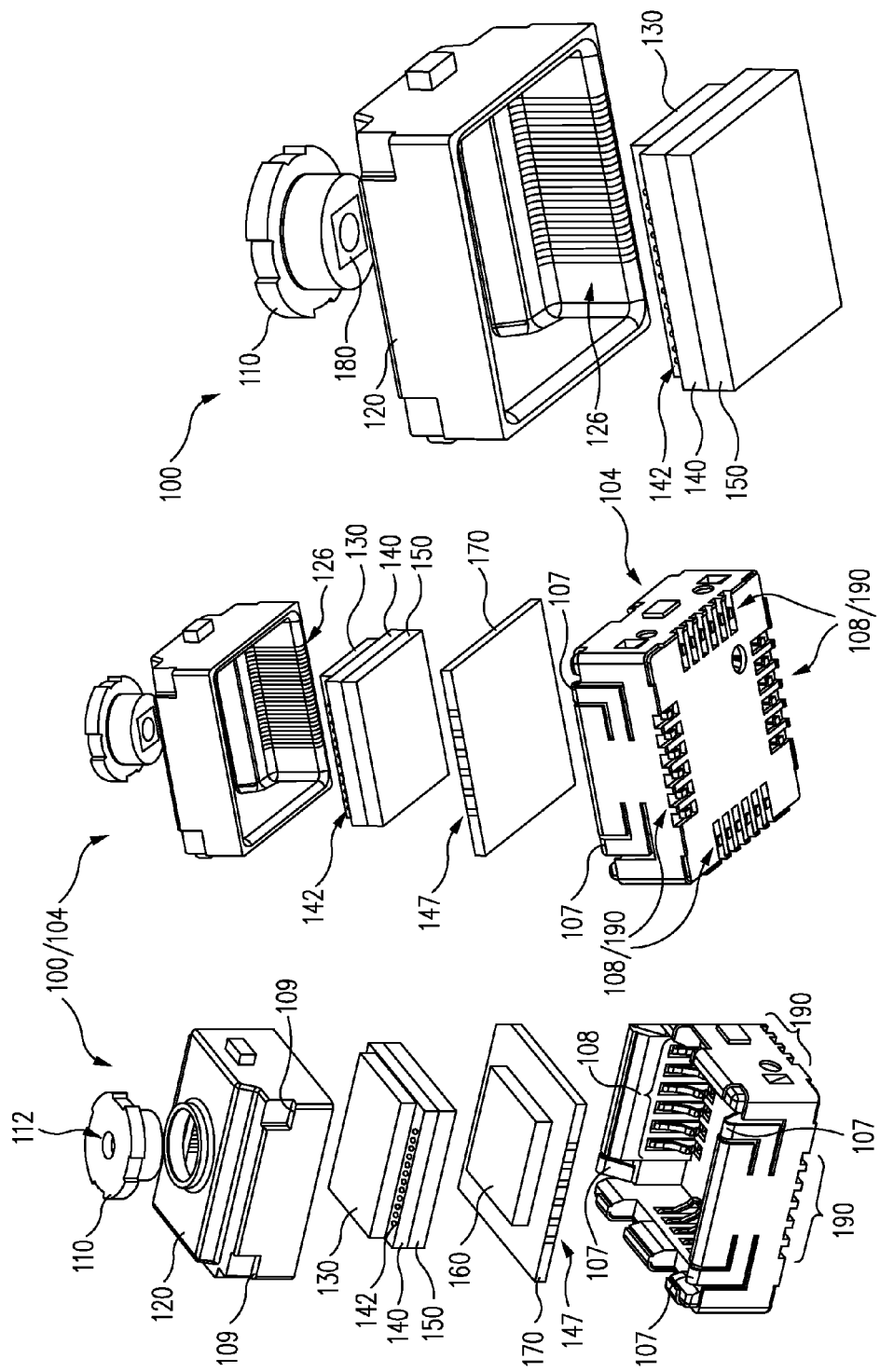
Figure 5M:
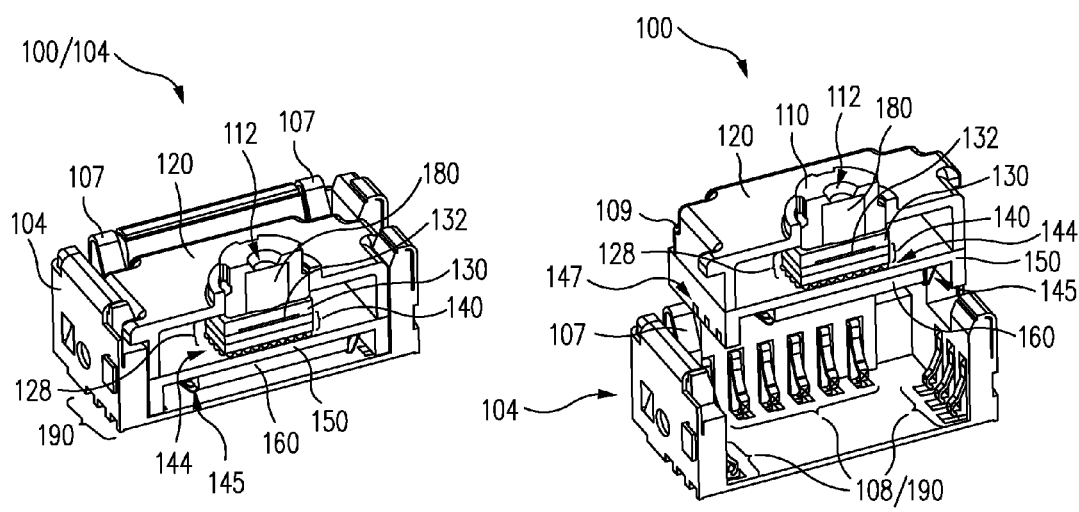
Figure 5N:
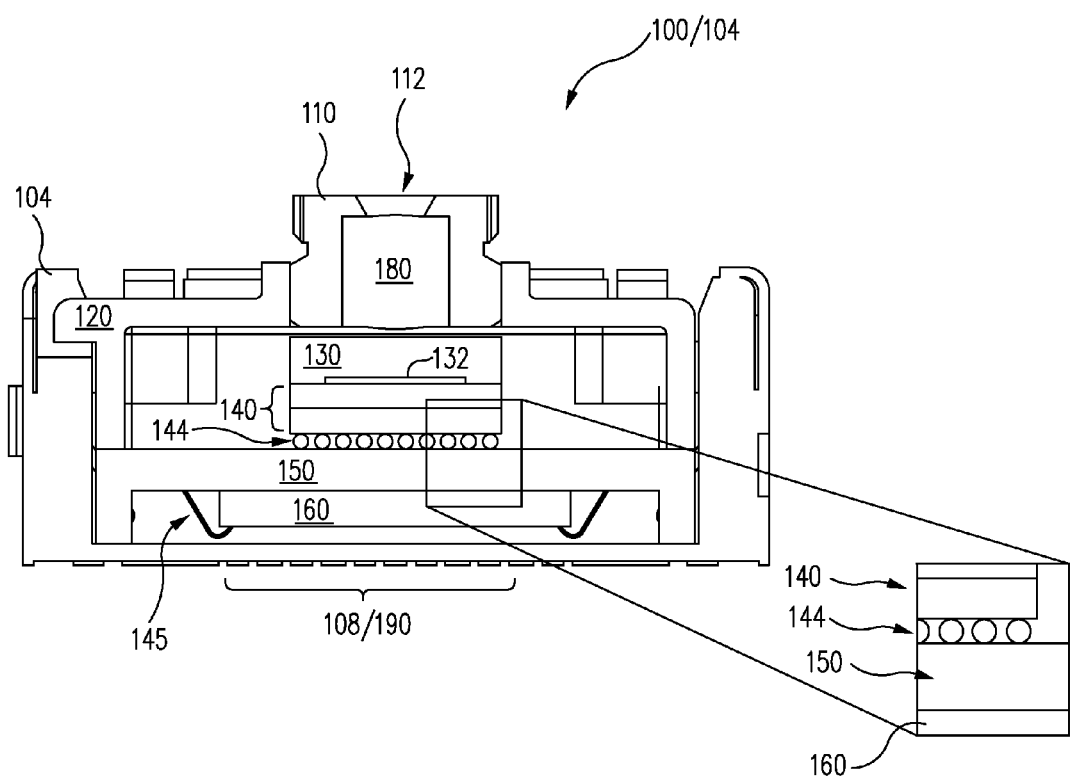
Figure 50:
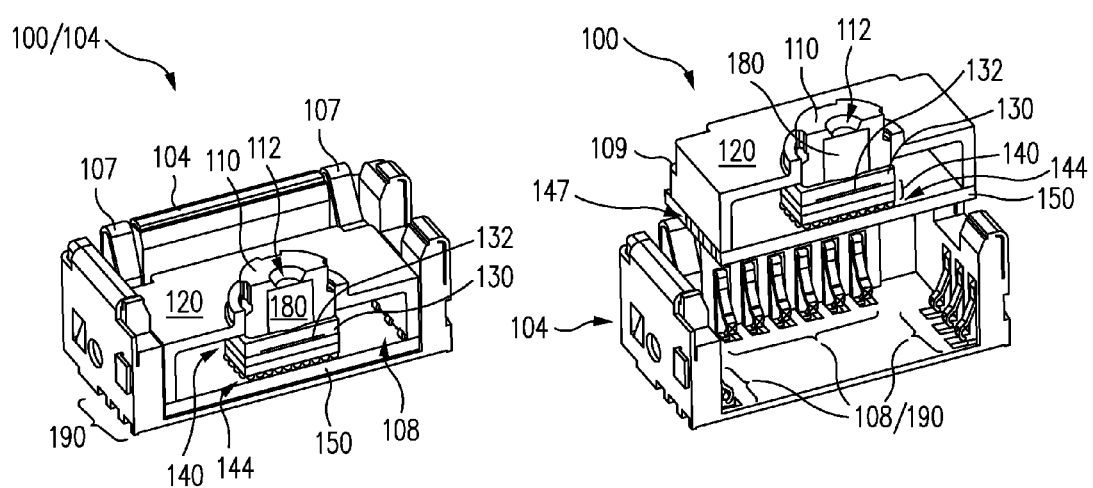
Figure 5P:
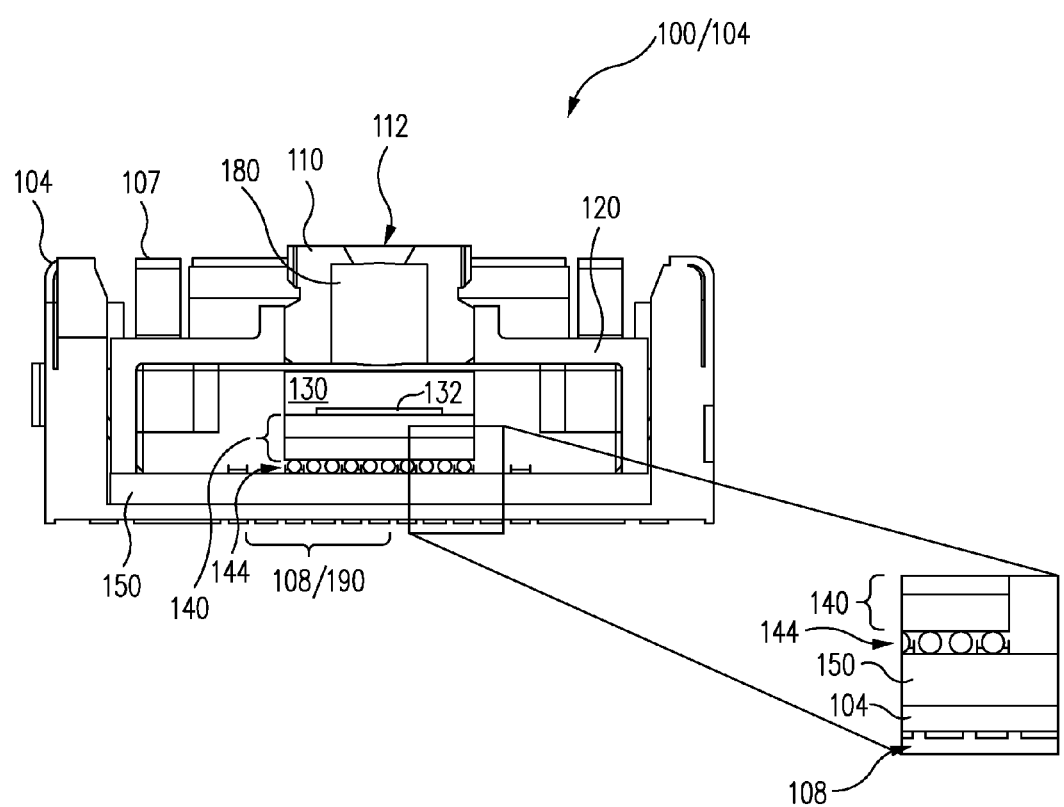

FIGS. 5F-P illustrate additional views of infrared imaging module 100 implemented with several form factors in accordance with various embodiments of the disclosure. For example, FIG. 5F illustrates an embodiment of infrared imaging module 100 similar to FIG. 5A. In FIG. 5F, electrical connections 126 are shown on an inside surface of housing 120. In addition, electrical connections 108 are depicted in a contrasting color for further clarity. Also, electrical connections 147 are shown on side surfaces of circuit board 170 which may connect to electrical connections 108.

FIG. 5G illustrates an embodiment of infrared imaging module 100 similar to FIG. 5A with electrical connections 108 depicted in a contrasting color for further clarity on a bottom surface of socket 104 which may be used to interface with appropriate connections of host device 102.

FIG. 5H illustrates an embodiment of infrared imaging module 100 similar to FIG. 5C. In FIG. 5H, electrical connections 126 are shown on an inside surface of housing 120. In addition, electrical connections 108 are depicted in a contrasting color for further clarity.

FIG. 5I illustrates an embodiment of infrared imaging module 100 that provides another view of the embodiment shown in FIG. 5H. In FIG. 5I, contacts 172 are shown on a bottom surface of circuit board 170 which may contact electrical connections 108 when infrared imaging module 100 is inserted into socket 104. Accordingly, it will be appreciated that the various components of infrared imaging module 100 may be electrically connected to host device 102 through contacts 172 and electrical connections 108.

FIG. 5J illustrates an embodiment of infrared imaging module 100 similar to FIG. 5D and with socket 104 similar to that illustrated in FIG. 5E. In FIG. 5J, electrical connections 108 are depicted in a contrasting color for further clarity. Also, electrical connections 147 are shown on side surfaces of circuit board 170 which may connect to electrical connections 108.

FIG. 5K illustrates an embodiment of infrared imaging module 100 that provides another view of the embodiment shown in FIG. 5J. In FIG. 5K, electrical connections 147 are further shown on bottom surfaces of circuit board 170 which may connect with appropriate electrical connections 108.

FIG. 5L illustrates several embodiments of infrared imaging module 100 in exploded views. For example, in FIG. 5L, electrical connections 126 are shown on an inside surface of housing 120. Also, electrical connections 147 are shown on side surfaces of circuit board 170 which may connect to electrical connections 108. In addition, electrical connections 108 are depicted in a contrasting color for further clarity inside socket and also on a bottom surface of socket 104 which may be used to interface with infrared imaging module 100 and host device 102.

FIG. 5M illustrates an embodiment of infrared imaging module 100 implemented with various components of infrared sensor assembly 128 (e.g., cap 130 and substrate 140) having a substantially uniform width. In one embodiment, such an implementation may permit the various components of infrared sensor assembly 128 to be singulated together during manufacture. In FIG. 5M, substrate 140 may be implemented with a split (e.g., multi-layer) implementation with the ROIC provided on one or both layers and connected to other circuitry of substrate 140 through the layers (e.g., through appropriate silicon vias or other connections). As also shown in FIG. 5M, substrate 140 may be connected to base 150 through solder balls 144 (e.g., to implement flip chip mounting), and processing module 160 may be connected to base 150 through wire bonds 145. FIG. 5N illustrates an embodiment of infrared imaging module 100 that provides another view of the embodiment shown in FIG. 5M.

FIG. 5O illustrates an embodiment of infrared imaging module 100 with infrared sensor assembly 128 implemented in a similar fashion as FIGS. 5M-N. In FIG. 5O, processing module 160 may be integrated as part of substrate 140.

FIG. 5P illustrates an embodiment of infrared imaging module 100 that provides another view of the embodiment shown in FIG. 5O. FIG. 5P further illustrates electrical connections 108 on a bottom surface of socket 104.

Additional implementations of infrared imaging modules 100 are also contemplated. For example, FIGS. 6-8 illustrate infrared imaging modules 100 implemented with several topologies in accordance with various embodiments of the disclosure.

Figure 6:
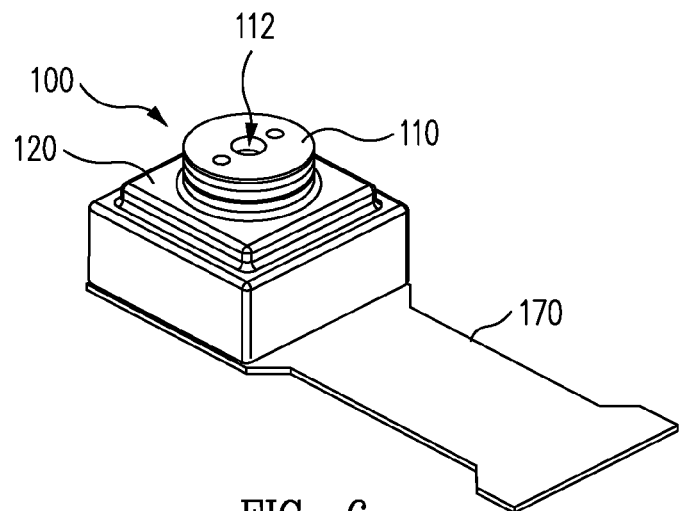
FIGS. 6-8 illustrate infrared imaging modules implemented with several topologies in accordance with various embodiments of the disclosure.

For example, FIG. 6 illustrates infrared imaging module 100 after encapsulation. FIG. 7 illustrates infrared imaging module 100 with processing module 160 mounted on circuit board 170 and external to housing 120 to provide a lower overall profile for imaging module 100.

Figure 7:
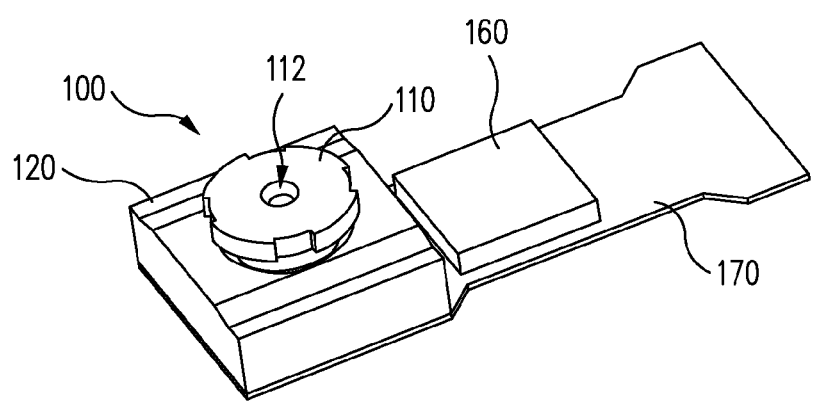
Figure 8:
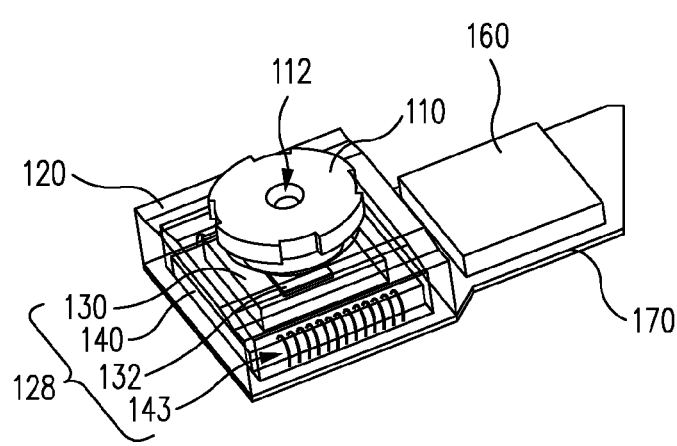

FIG. 8 illustrates infrared imaging module 100 of FIG. 7 with housing 120 shown transparent for purposes of illustrating examples of cap 130, an array of infrared sensors 132, and wire bonds 143. As shown in FIG. 8, various components of infrared sensor assembly 128 may be connected to circuit board 170 through wire bonds 143.

In accordance with additional embodiments of the disclosure, housing 120 may be implemented with a substantially non-metal cover configured to substantially or completely enclose various components of infrared imaging module 100. One or more metal layers may be disposed on various interior and/or exterior surfaces of the cover (e.g., a plurality, a majority, substantially all, or all of such surfaces). Such implementations may be used to reduce the effects of various environmental conditions which may otherwise adversely affect the performance of infrared imaging module 100. In addition, one or more conductive traces (e.g., electrical connections) may be built into housing 120 and/or on surfaces of housing 120 to facilitate the passing of signals from components of the infrared imaging device such as infrared sensor assembly 128, a temperature measurement component, and/or other components. Various fiducial markers may be provided on exterior and/or interior surfaces of the housing. Such fiducial markers may be used, for example, to align various components during manufacture of infrared imaging module 100. These and other features and advantages will be further described herein.

Figure 9A:
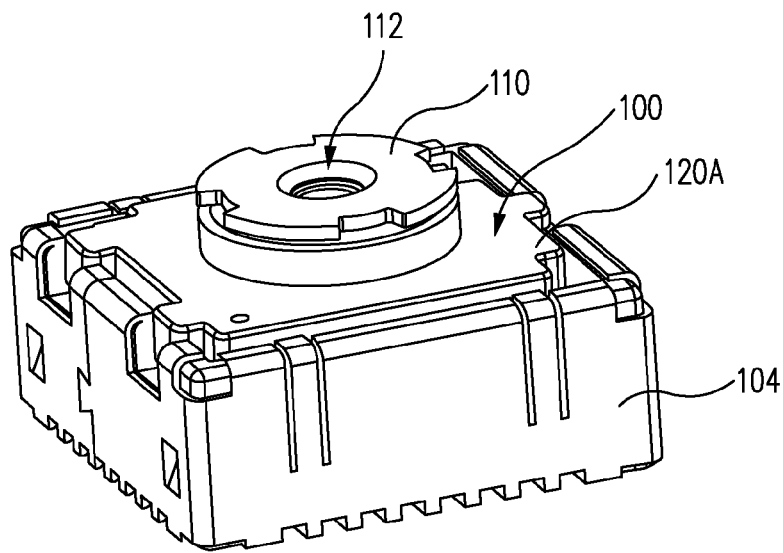
FIGS. 9A-B illustrate an infrared imaging module installed in a socket in accordance with various embodiments of the disclosure.
Figure 9B:
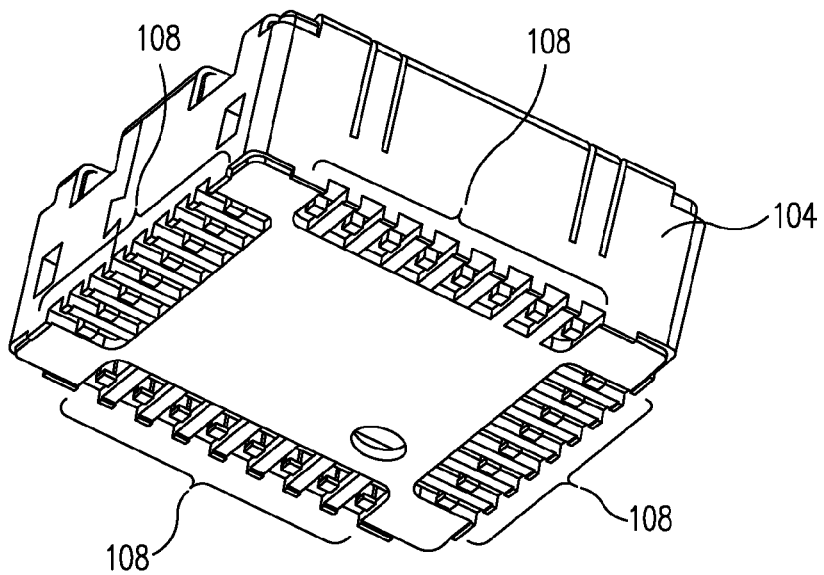

FIGS. 9A and 9B illustrate top perspective and bottom perspective views, respectively, of infrared imaging module 100 installed in socket 104 in accordance with various embodiments of the disclosure. As previously described and further shown in FIG. 9A, infrared imaging module 100 may include an implementation of housing 120 (denoted 120A) and lens barrel 110 having aperture 112. As also previously described and further shown in FIG. 9B, socket 104 may include electrical connections 108 which may contact corresponding electrical connections of infrared imaging module 100.

Figure 10A:
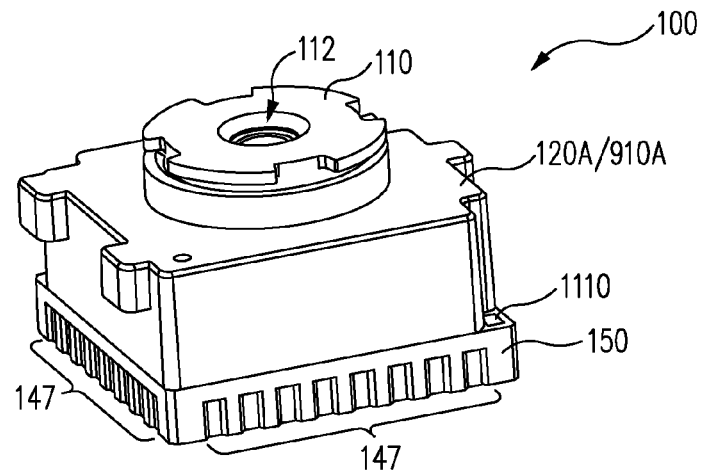
FIG. 10A illustrates the infrared imaging module of FIG. 9A removed from the socket in accordance with an embodiment of the disclosure.

FIG. 10A illustrates infrared imaging module 100 removed from socket 104 in accordance with an embodiment of the disclosure. As previously described and further shown in FIG. 10A, infrared imaging module 100 may include base 150 with electrical connections 147 to connect various portions of infrared imaging module 100 to socket 104 and/or host device 102.

Figure 10B:
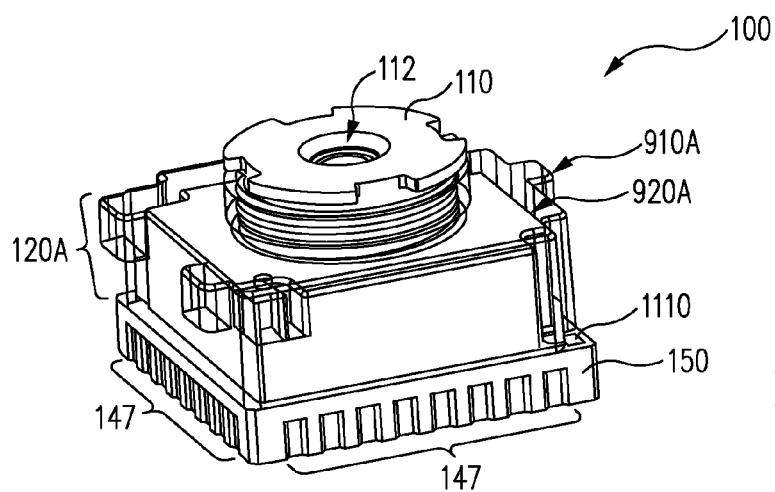
FIG. 10B illustrates the infrared imaging module of FIG. 9A with a cover of a housing shown in semi-transparent form to reveal a metal layer of the housing in accordance with an embodiment of the disclosure.

In FIG. 10A, housing 120A is shown having a substantially non-metal cover 910A with exposed exterior surfaces. In this illustrated embodiment, exterior surfaces of housing 120A are not covered by metal layers. FIG. 10B illustrates infrared imaging module 100 with cover 910A of housing 120A shown in semi-transparent form to reveal a metal layer 920A (e.g., a metalized surface) of housing 120A in accordance with an embodiment of the disclosure. In this illustrated embodiment, metal layer 920A is disposed on substantially all interior surfaces of cover 910A.

Figure 10C:
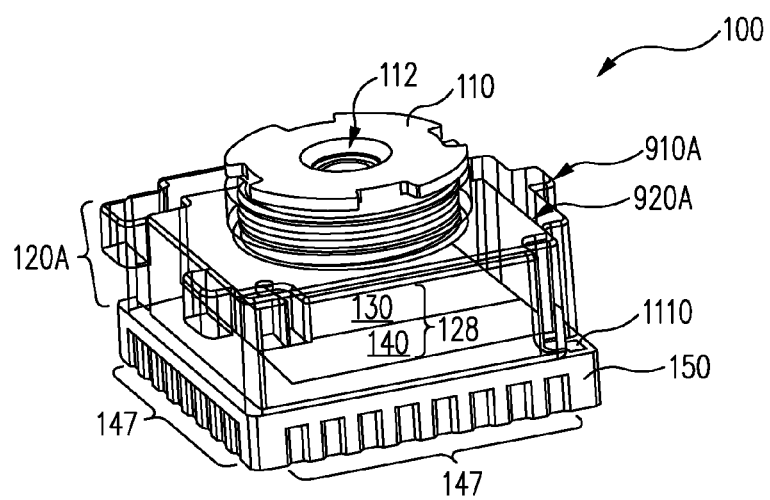
FIG. 10C illustrates the infrared imaging module of FIG. 9A with the cover and the metal layer both shown in semi-transparent form to reveal several components enclosed by the housing in accordance with an embodiment of the disclosure.

FIG. 10C illustrates infrared imaging module 100 with cover 910A and metal layer 920A both shown in semi-transparent form to reveal several components enclosed by housing 120A in accordance with an embodiment of the disclosure. In this regard, when infrared imaging module 100 is assembled, housing 120A may substantially enclose various components. For example, as shown in FIG. 10C, housing 120A may substantially enclose infrared sensor assembly 128 which may be implemented, for example, with a focal plane array in a vacuum package assembly sealed by cap 130 and substrate 140.

Although housing 120A and other housings 120B-D described herein are illustrated as having generally square or rectangular shapes, any desired shape may be used for housings 120A-D to at least partially or completely enclose one or more desired components of infrared imaging module 100. In addition, although housing 120A is illustrated as mounted on base 150, other mounting configurations are also contemplated for any of housings 120A-D. Any desired set of components may be substantially or completely enclosed by housings 120A-D in various embodiments to seal such components from external environments.

Figure 11A:
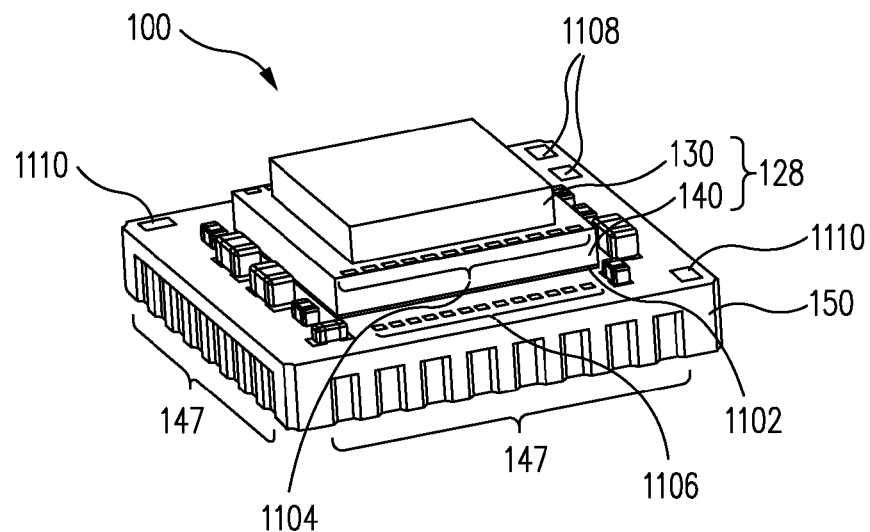
FIGS. 11A-B illustrate the infrared imaging module of FIG. 9A with the housing removed in accordance with various embodiments of the disclosure.
Figure 11B:
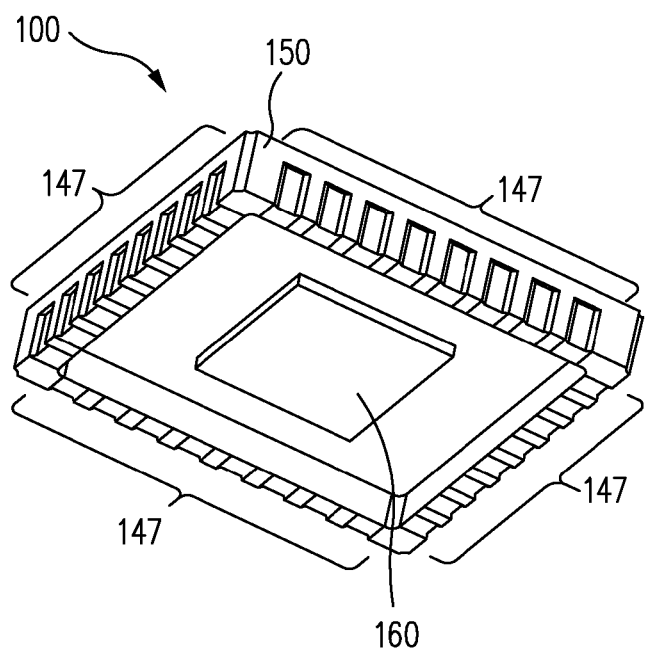

FIGS. 11A-B illustrate infrared imaging module 100 with housing 120A removed in accordance with various embodiments of the disclosure. For example, in FIG. 11A, cap 130 and substrate 140 of infrared sensor assembly 128 are shown mounted on base 150 with a thermal spreader 1102 (e.g., copper or graphite in some embodiments) therebetween. Also in FIG. 11A, wire bond contacts 1104 and 1106 are shown on substrate 140 and base 150, respectively, to receive wire bonds 143 (not shown in FIG. 11A).

In FIG. 11B, processing module 160 is illustrated as being mounted on an underside of base 150. For example, in some embodiments, processing module 160 may be connected to substrate 140 through wire bonds 143 and 145 (not shown in FIG. 11B) as previously described.

Figure 12A:
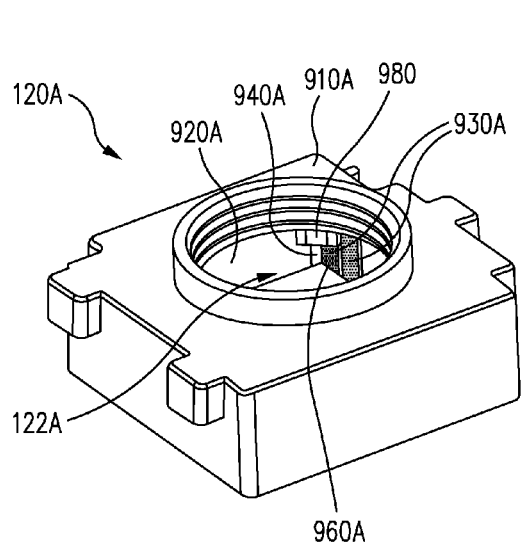
FIGS. 12A-D illustrate several views of an implementation of the housing of the infrared imaging module of FIG. 9A having an interior metal layer in accordance with various embodiments of the disclosure.
Figure 12B:
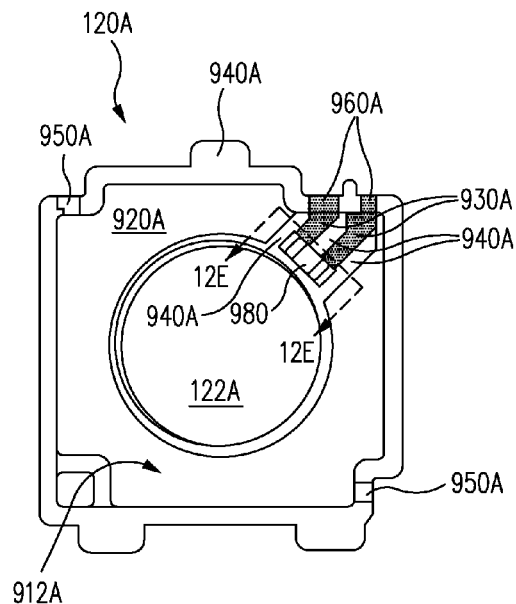
Figure 12C:
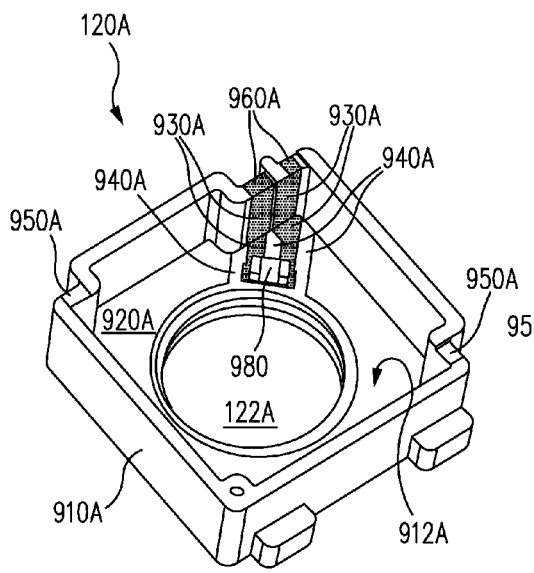
Figure 12D:
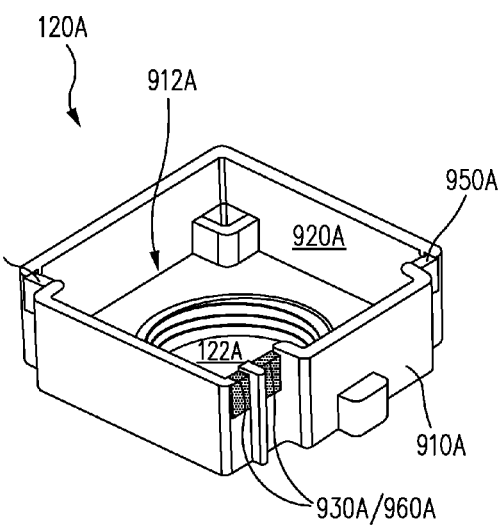
Figure 12E:
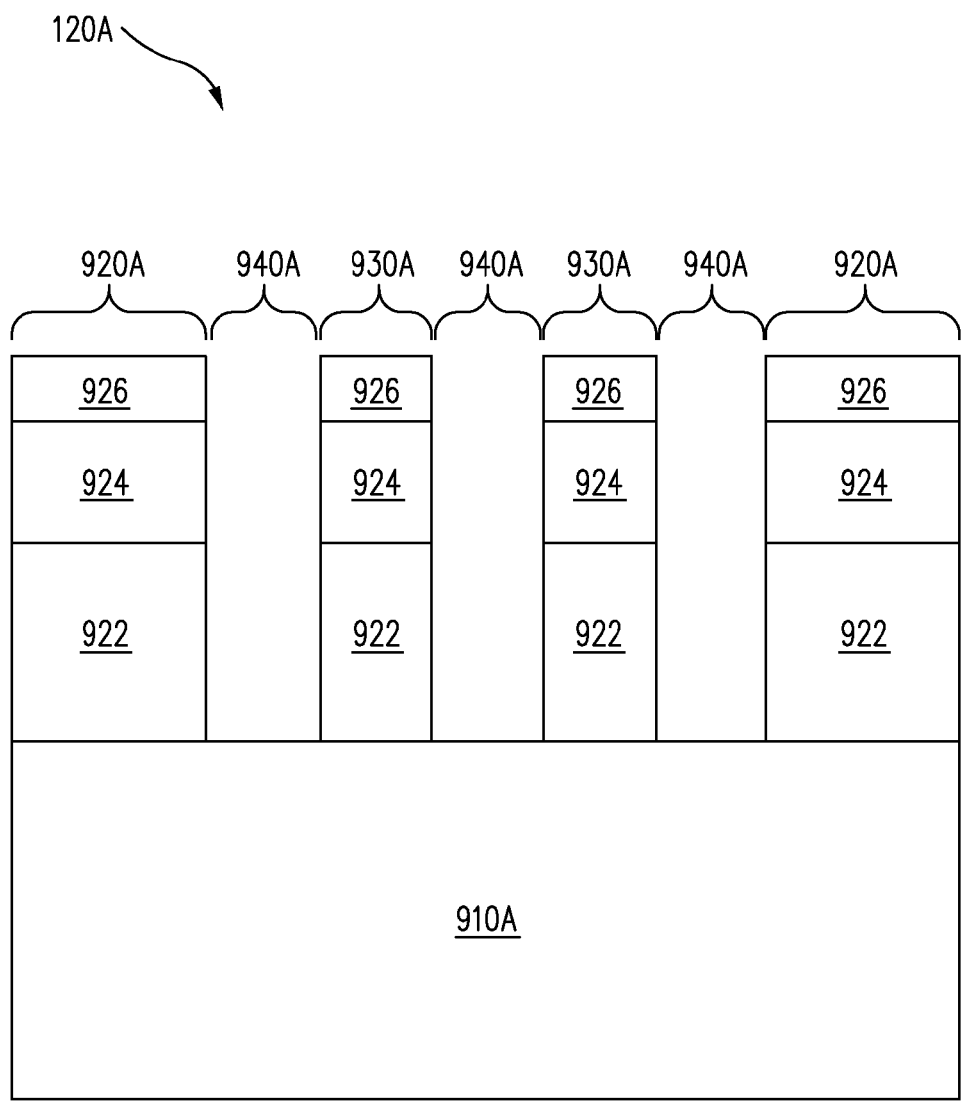
FIG. 12E illustrates a cross section taken at line 12E-12E of FIG. 12B in accordance with an embodiment of the disclosure.

FIGS. 12A-D illustrate several views of housing 120A, and FIG. 12E illustrates a cross section taken at line 12E-12E of FIG. 12B, in accordance with various embodiments of the disclosure. Housing 120A may include a threaded aperture 122A configured to receive lens barrel 110. Housing 120A may also include a cover 910A and one or more metal layers. Cover 910A may be a substantially non-metal cover implemented with material having relatively low thermal conductivity and relatively high emissivity (e.g., emissivity in a range of approximately 0.8 to approximately 0.95 in some embodiments). For example, cover 910A may be comprised substantially of plastic and/or other appropriate material.

One or more metal layers 920A may be disposed on various interior and/or exterior (e.g., inside and/or outside) surfaces of cover 910A (e.g., a plurality, a majority, substantially all, or all of such surfaces). For example, in one embodiment, metal layer 920A may be disposed on various interior surfaces of cover 910A facing infrared sensor assembly 128 in the manner shown in FIGS. 12A-D. In another embodiment, metal layer 920A may be disposed on various exterior surfaces of cover 910A that face external components or external environments. In some embodiments, cover 910A may undergo a metalization process in which various metal layers are deposited and/or otherwise provided on cover 910A.

Figure 13:
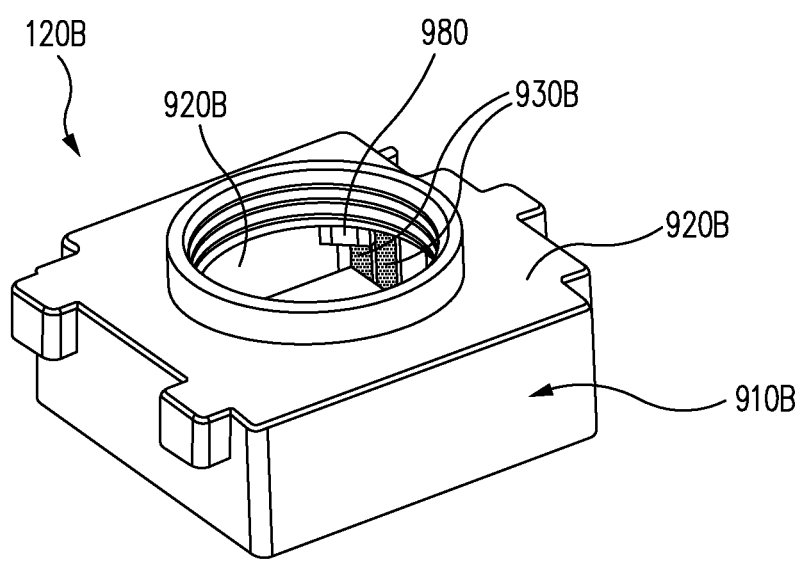
FIG. 13 illustrates a housing having interior and exterior metal layers in accordance with an embodiment of the disclosure.

Combinations of interior and exterior metal layers 920A may be used. For example, in FIG. 13, another implementation of housing 120 (denoted 120B) is shown with two metal layers 920B provided on interior and exterior surfaces of a substantially non-metal cover 910B, and with conductive traces 930B provided therein in the manner of conductive traces 930A (further described herein).

As shown in FIGS. 12A-E, housing 120A may include various conductive traces 930A that are electrically isolated from metal layer 920A. In various embodiments, conductive traces 930A may be provided on one or more interior surfaces, one or more exterior surfaces, and/or in walls of cover 910A. In various embodiments, conductive traces 930A may be used to provide electrical connections between various components within an interior cavity 912A enclosed by housing 120A (e.g., the space occupied by infrared sensor assembly 128 and/or other components) and/or from various components within cavity 912A to an exterior of housing 120A. In one embodiment, insulating material (e.g., having low electrical conductivity) may be provided in areas 940A between conductive traces 930A and metal layer 920A. In another embodiment, conductive traces 930A may be substantially surrounded by insulating material. In yet another embodiment, voids (e.g., empty spaces) may be introduced between conductive traces 930A and metal layer 920A such that the substantially non-conductive cover 910A is exposed and effectively insulates conductive traces 930A from metal layer 920A.

In various embodiments, metal layer 920A may be implemented with material having relatively high thermal conductivity, relatively low emissivity (e.g., emissivity in a range of approximately 0.02 to approximately 0.11 in some embodiments), and having a tendency to maintain these properties despite exposure to a variety of environmental conditions over several years.

In some embodiments, metal layer 920A may be implemented as one or more layers disposed on cover 910A (e.g., disposed directly on cover 910A and/or on top of one or more intermediate layers and/or structures). In some embodiments, metal layer 920A may be implemented by a plurality of sublayers of different metals, each of which may have beneficial characteristics to permit the multi-layered implementation to achieve improved performance over a single layer implementation using a single type of metal.

For example, a copper sublayer may be provided at low cost which exhibits high thermal conductivity and affixes well to plastic. Such a copper sublayer may oxidize rapidly to a high emissivity and thus may be coated in some embodiments. As another example, a nickel sublayer may be provided which maintains low emissivity even after oxidation. As another example, a gold sublayer may be expensive to deposit in thick layers and may not affix well to plastic, but exhibits low emissivity and generally resists oxidization. Thus, by implementing metal layer 920A as multiple sublayers, metal layer 920A may exhibit various advantages associated with different types of metals, while also compensating for various performance tradeoffs associated with particular types of metals.

In this regard, FIG. 12E illustrates a cross section of housing 120A taken at line 12E-12E of FIG. 12B in accordance with an embodiment of the disclosure. In FIG. 12E, metal layer 920A is implemented as a plurality of sublayers on cover 910A. In this illustrated embodiment, metal layer 920A may include: a copper sublayer 922 (e.g., a base sublayer) disposed on cover 910A having a thickness of approximately 10 μm (e.g., in a range of approximately 4 μm to approximately 16 μm); a nickel sublayer 924 (e.g., an intermediate sublayer) having a thickness of approximately 6 μm or 6.5 μm (e.g., in a range of approximately 2.5 μm to approximately 10.5 μm) which also may be thicker to improve the performance of metal layer 920A in providing electromagnetic interference shielding further described herein; and/or a gold sublayer 926 (e.g., a top sublayer) having a thickness of approximately 0.1 μm (e.g., in a range of approximately 0.05 μm to approximately 0.15 μm) or in a range of approximately 0.1 μm to approximately 3 μm.

As shown in FIGS. 12B-D, metal layer 920A may be implemented to extend at areas 950A over a lip of cover 910A and onto an outer surface of cover 910A. Areas 950A may be used, for example, to electrically connect metal layer 920A to one or more electrical connections 1110 (e.g., pads, see FIGS. 10A-C and 11A).

Similarly, as shown in FIGS. 12A-D, conductive traces 930A may be implemented to extend at areas 960A over a lip of cover 910A and onto an outer surface of cover 910A. Areas 960A may be used, for example, to electrically connect one or more conductive traces 930A to one or more electrical connections 1108 (e.g., pads, see FIG. 11A).

Electrical connections 1108 and 1110 may be used for various purposes including, for example, grounding, production assembly evaluation, operation (e.g., to transmit and/or receive electrical signals between various components), and/or other purposes as appropriate. In some embodiments, conductive epoxy or solder may be provided to secure and electrically connect areas 950A and/or 960A to one or more electrical connections 1110 and/or 1108, respectively.

In some embodiments, housing 120A may be manufactured in a manner that permits conductive traces 930A and/or other components to be included in or on housing 120A. For example, conductive traces 930A may be manufactured as part of metal layer 920A. In this regard, conductive traces 930A may be efficiently provided with metal layer 920A during a metalization operation, and then electrically isolated from the remainder of metal layer 920A by appropriate insulating material or voids. Moreover, by providing conductive traces 930A as part of a metalization process for metal layer 920A, the overall cost of housing 120A may be reduced over conventional approaches using discrete wires/cables to provide electrical connections.

For example, in the embodiment illustrated in FIG. 12E, conductive traces 930A have been formed as part of a metallization process for metal layer 920A using the same sublayers 922, 924, and 926. Voids in areas 940A may be formed, for example, by masking cover 910A during formation of metal layer 920A, etching area 940A after formation, and/or other appropriate techniques.

In some embodiments, housing 120A may be a molded interconnect device (MID) manufactured in accordance with appropriate injection molding techniques. In this regard, housing 120A may be implemented with electrical connections (e.g., electrical connections 126 described herein or others as appropriate).

In some embodiments, various components may be partially or fully embedded (e.g., implanted, formed, or otherwise provided) in housing 120A, or mounted on appropriate interior or exterior surfaces of housing 120A using such manufacturing techniques. For example, as shown in FIGS. 12A-C, a temperature measurement component 980 (e.g., a thermistor, temperature diode, and/or other appropriate component) may be provided. Temperature measurement component 980 may also be electrically connected to one or more conductive traces 930A and/or electrical connections 126. As a result, temperature measurement component 980 may provide signals used to accurately measure temperatures associated with housing 120A. Such temperatures may include, for example, temperatures of housing 120A itself, temperatures of cavity 912A, temperatures of components disposed in cavity 912A, and/or other related temperatures.

For example, signals from temperature measurement component 980 may be carried by conductive traces 930A and/or electrical connections 126 from the walls of housing 120A or cavity 912A to appropriate components external to housing 120A and/or appropriate components of infrared imaging module 100 for processing. Such temperature measurements may be used to more accurately determine radiation contributions from out-of-field sources, improve the thermographic accuracy of the infrared sensor assembly 128, and perform various non-uniformity correction processes such as supplemental flat field corrections and/or to correct for out-of-field radiation. Temperature measurement component may be implemented in the same or similar fashion for housings 12B-D described herein.

Figure 14A:
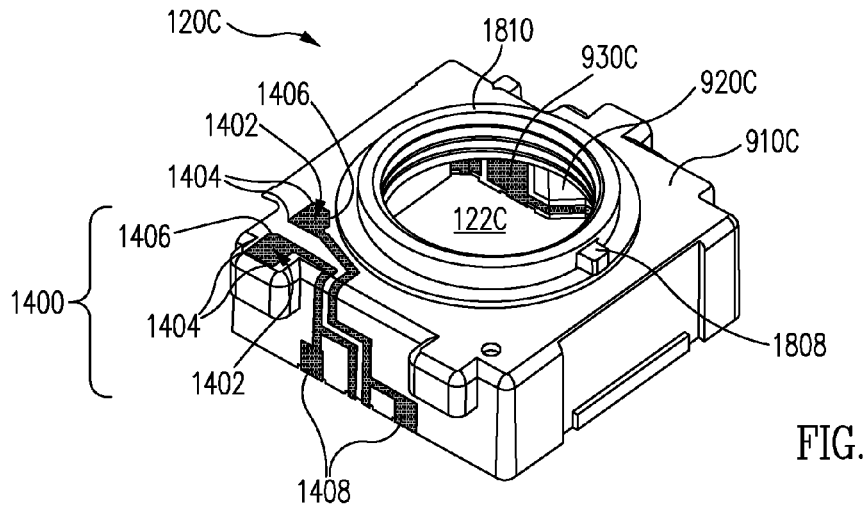
FIGS. 14A-G illustrate several views of a housing having an interior metal layer and external conductive traces in accordance with various embodiments of the disclosure.
Figure 14B:
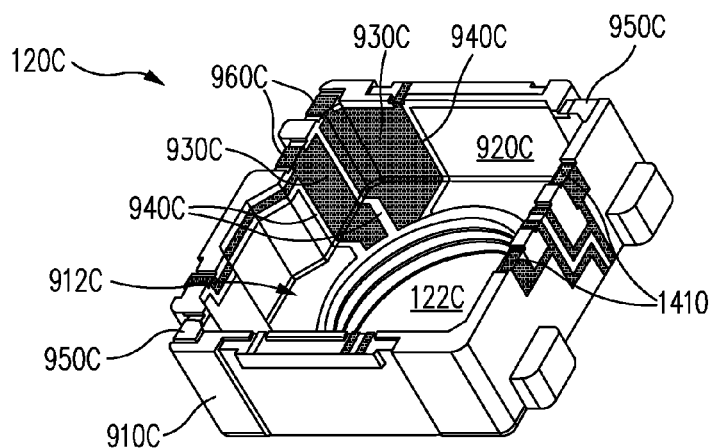
Figure 14C:
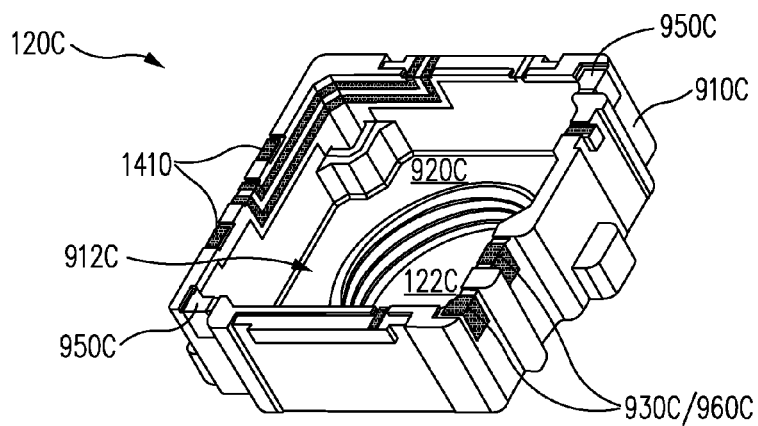
Figure 14D:
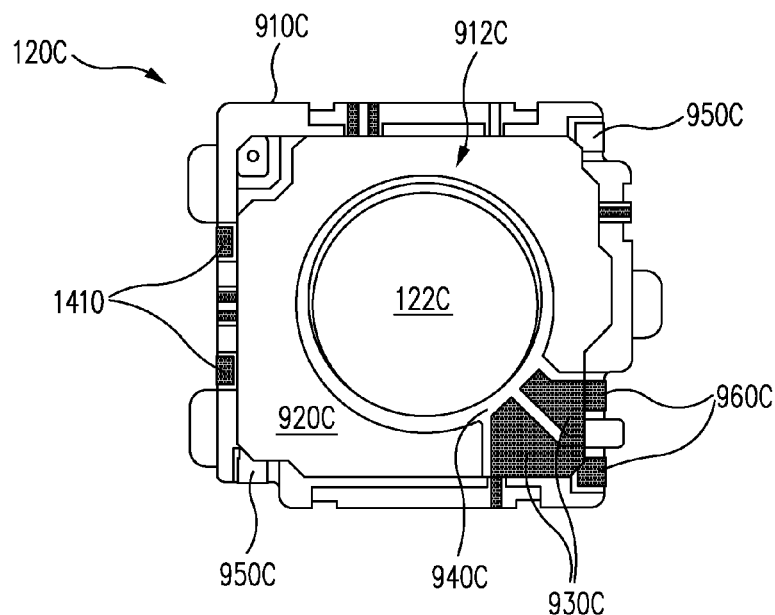
Figure 14E:
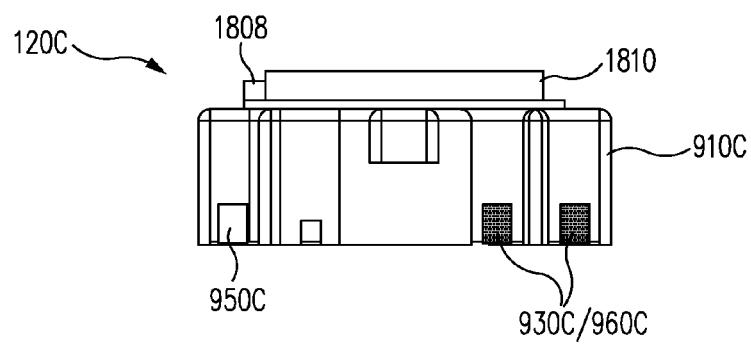
Figure 14F:
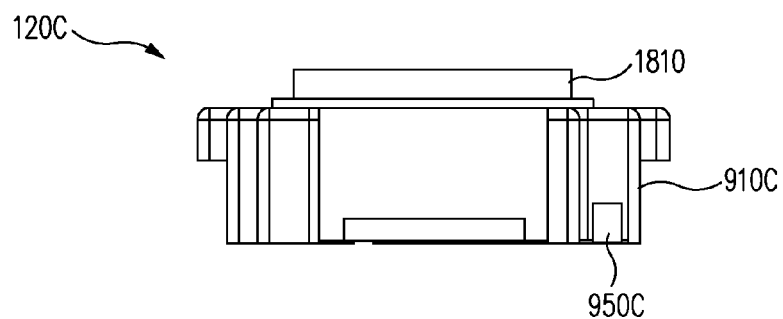
Figure 14G:
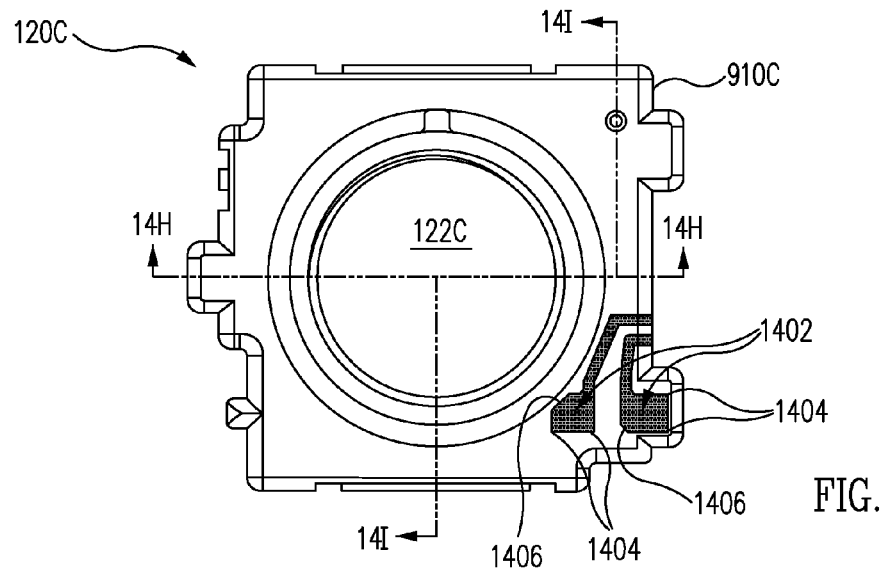
Figure 14H:
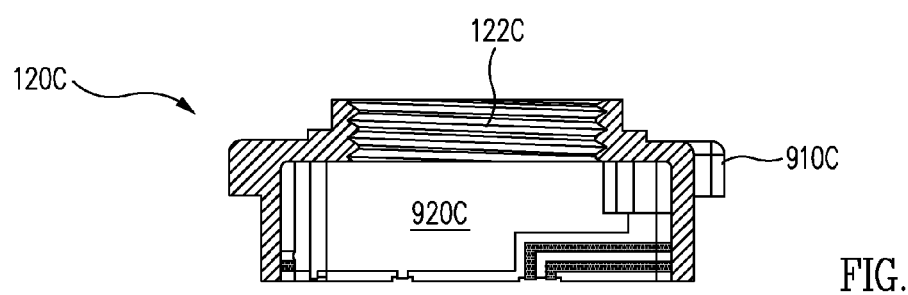
FIG. 14H illustrates a cross section taken at line 14H-14H of FIG. 14G in accordance with an embodiment of the disclosure.
Figure 14I:
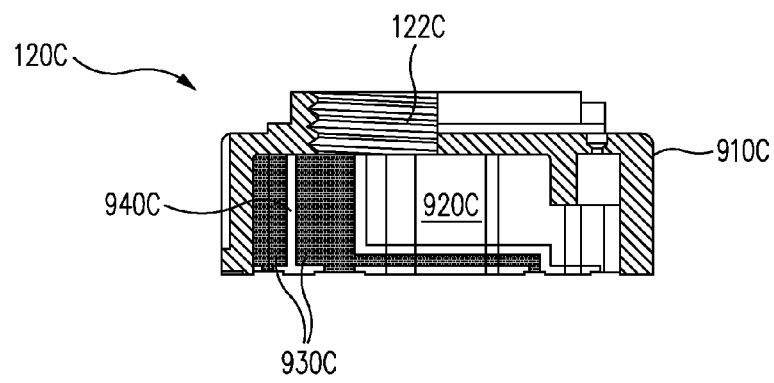
FIG. 14I illustrates a cross section taken at line 14I-14I of FIG. 14G in accordance with an embodiment of the disclosure.

FIGS. 14A-G illustrate several views of another implementation of housing 120 (denoted 120C) in accordance with various embodiments of the disclosure. FIG. 14H illustrates a cross section taken at line 14H-14H of FIG. 14G in accordance with an embodiment of the disclosure. FIG. 14I illustrates a cross section taken at line 14I-14I of FIG. 14G in accordance with an embodiment of the disclosure.

As shown, housing 120C includes a cover 910C, a cavity 912C, a threaded aperture 122C, a metal layer 920C, conductive traces 930C, areas 940C, areas 950C, and areas 960C which may be used in the same and/or similar fashion as corresponding portions of covers 920A-B described herein. Housing 120C also includes external conductive traces 1400 which may be used as fiducial markers and/or electrical connections further described herein.

By providing metal layers 920A-C on interior and/or exterior surfaces of covers 910A-C, various problems associated with conventional infrared imaging systems may be substantially reduced. For example, conventional systems may experience reduced thermographic accuracy and may exhibit low spatial frequency non-uniformity resulting from undesired external radiation, such as out-of-field radiation that is received from a location outside a field of view of a target scene desired to be imaged, and/or received from various components of such systems.

These undesired external radiation effects may be substantially reduced in infrared imaging module 100 by the low emissivity of metal layers 920A-C. In particular, the low emissivity of metal layers 920A-C may reduce the effects of out-of-field radiation received by infrared sensor assembly 128 by reducing the power emitted by housings 120A-C toward infrared sensor assembly 128.

In this regard, the power emitted by a surface may be expressed as $W(\lambda,T)*e$, where $\lambda$ is the wavelength of infrared radiation, T is the temperature of the surface, and e is the emissivity of the surface. Thus, the emitted power may be considered a linear function of the emissivity.

Metal such as gold has an emissivity of approximately 0.02, nickel has an emissivity in a range of approximately 0.05 to approximately 0.11, and aluminum has an emissivity in a range of approximately 0.05 to approximately 0.09, all of which may be substantially less than that of covers 910A-C (e.g., having an emissivity in a range of approximately 0.8 to approximately 0.95 in the case of plastic or similar material). Accordingly, considering the emissivities discussed above, power emitted from metal layers 920A-C may be approximately one tenth of that emitted from covers 910A-C.

Thus, with metal layers 920A-C present, less out-of-field radiation (e.g., power) is received by infrared sensor assembly 128 in response to temperature changes in covers 910A-C (e.g., an approximately 90% reduction in some embodiments). The reduced power emitted by metal layers 920A-C in comparison to covers 910A-C results in corresponding smaller output changes experienced by infrared sensor assembly 128 in response to such radiation (e.g., fewer effects of out-of-field radiation will be represented in image frames captured by infrared sensor assembly 128). As a result, infrared sensor assembly 128 may be operated with greater thermographic accuracy, as there is less need to compensate for out-of-field radiation when performing temperature measurements of objects in a target scene. In addition, the reduced amount of radiation emitted by metal layers 920A-C in comparison to covers 910A-C may result in infrared sensor assembly 128 exhibiting less low spatial frequency non-uniformity. Also, by reducing the radiation received by infrared sensor assembly 128, possible errors in estimating contributions of out-of-field radiation may be correspondingly reduced. As a result, infrared sensor assembly 128 may be operated with improved thermographic accuracy and uniformity.

Metal layers 920A-C may be used to improve the thermal conductivity of infrared imaging module 100 and thus reduce additional problems associated with conventional infrared imaging systems. In this regard, conventional systems may experience non-uniform heating (e.g., hot spots) from various components (e.g., mounted inside or outside a housing) and/or various external heat sources. As a result, the temperature distribution across such systems may vary significantly, especially as various components are selectively switched on and off. If left uncorrected, non-uniform heating of a housing may result in low spatial frequency non-uniformities exhibited at the sensors.

Such non-uniform heating effects may be substantially reduced in infrared imaging module 100 by the high thermal conductivity of metal layers 920A-C. Covers 910A-C may be implemented with a material (e.g., comprised substantially of plastic and/or other material) having relatively low thermal conductivity (e.g., also a relatively slow thermal time constant). However, by providing metal layers 920A-C with a higher thermal conductivity (e.g., also a faster thermal time constant) than covers 910A-C, heat may be more uniformly distributed around infrared sensor assembly 128 and thus reduce the detrimental effects of non-uniform heating, especially where infrared imaging module 100 is used in close proximity to other components, such as in personal electronic devices.

In addition, the high thermal conductivity of metal layers 920A-C may permit components of infrared imaging module 100 to be more effectively cooled by convection. In this regard, heat generated by infrared sensor assembly 128 and processing module 160 may be received by the various surfaces of metal layers 920A-C and passed to housings 120A-C which provides a large surface area for convection cooling. As a result, temperature variations in housings 120A-C may be reduced to allow for more accurate temperature measurements of housings 120A-C (e.g., by temperature measurement component 980). In some embodiments, the increased heat flow in housings 120A-C permits infrared imaging module 100 to achieve a lower steady state operating temperature which improves the dynamic range of infrared sensors 132 and the reliability of infrared imaging module 100.

Metal layers 920A-C may also be used to provide an electromagnetic interference (EMI) shield in a manner that overcomes several problems associated with conventional approaches. In this regard, conventional systems may utilize EMI shields implemented as separate structures that must be positioned over various components for shielding. Such structures occupy valuable space, reduce convective cooling, and involve additional assembly costs, all of which make them poorly suited to small form factor applications.

These drawbacks may be substantially reduced by metal layers 920A-C. In some embodiments, metal layers 920A-C may be grounded (e.g., at areas 950A and 950C as discussed) and operate as an EMI shield. In particular, metal layers 920A-C may operate as a shield to substantially attenuate EMI emitted by infrared sensor assembly 128, processing module 160, and/or various components enclosed by housings 120A-C to thus shield components of host device 102 and/or an external environment from the EMI and reduce possible interference. Metal layers 920A-C may also operate as a shield to substantially attenuate external EMI (e.g., EMI incident on covers 910A-C) to shield infrared sensor assembly 128 and/or various components enclosed by housings 120A-C.

Thus, in contrast to conventional EMI shields, metal layers 920A-C effectively provide a compact EMI shield integrated with housings 120A-C that does not occupy additional external space and does not require the fitting of additional external components (e.g., thus reducing materials and assembly costs). In addition, as discussed herein in some embodiments, metal layers 920A-C may actually improve the cooling of infrared imaging module 100.

As discussed, housing 120C includes external conductive traces 1400 which may be used as fiducial markers. For example, as shown in FIGS. 14A and 14G, conductive traces 1400 include pads 1402 which include several substantially L-shaped features as fiducial markers 1404 (e.g., at several corners of pads 1402). Pads 1402 also include fiducial markers 1406 (e.g., chamfered corners) which may be distinguished from fiducial markers 1404 when analyzed by an image processing system. Such fiducial markers 1404 and/or 1406 may be used to determine the alignment of housing 120C as it is assembled with other portions of infrared imaging module 100.

Figure 15:
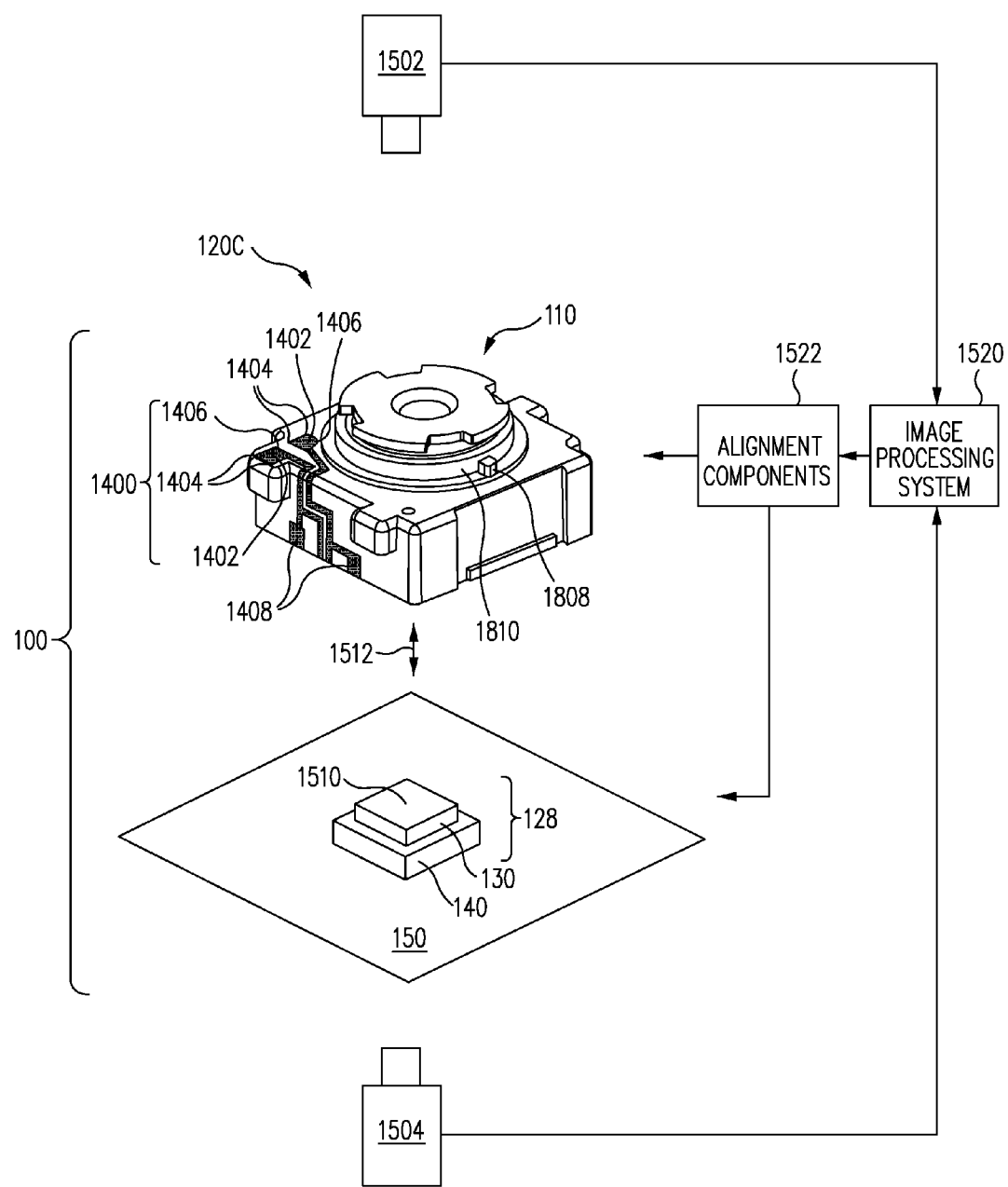
FIG. 15 illustrates an alignment technique used to assemble an infrared imaging module in accordance with an embodiment of the disclosure.

A machine-based assembly process may use one or more cameras (or other imaging devices) to capture images of pads 1402 during assembly of infrared imaging module 100 to determine the alignment of housing 120C relative to other components using fiducial markers 1402. For example, FIG. 15 illustrates an alignment technique used to assemble infrared imaging module 100 in accordance with an embodiment of the disclosure. In FIG. 15, housing 120C (e.g., with lens barrel 110 preinstalled therein) is ready to be installed on base 150 where it will enclose infrared sensor assembly 128 (e.g., which is shown installed on base 150).

In order for infrared imaging module 100 to provide accurate images, it is preferable that infrared sensor assembly 128 and lens barrel 110 be precisely aligned such that a center 1510 of the infrared sensor assembly 128 (e.g., corresponding to the center of the array of infrared sensors 132 provided thereby) be aligned with an optical axis 1512 of lens barrel 110. To facilitate this alignment, a camera 1502 (e.g., visible, infrared, or other type of camera) captures images of a top surface of housing 120C as it is positioned relative to infrared sensor assembly 128. Such captured images may be received and analyzed by an appropriate processing system 1520 to determine the current alignment of housing 120C relative to infrared sensor assembly 128. In this regard, processing system may use fiducial markers 1404 and/or 1406 in the captured images to determine the alignment of housing 120C relative to infrared sensor assembly 128.

Accordingly, housing 120C, infrared sensor assembly 128, and/or base 150 may be appropriately repositioned by alignment components 1522 (e.g., actuators, mechanical devices, electromechanical devices, and/or others) and additional images may be captured in an iterative fashion until housing 120C is accurately aligned with infrared sensor assembly 128. Housing 120C may then be installed on base 150 as further described herein.

Although fiducial markers 1404 and 1406 are shown on the top surface of housing 120C in FIG. 15, it is contemplated that fiducial markers may be provided on a bottom surface of housing 120C. In this regard, a camera 1504 (e.g., visible, infrared, or other type of camera) may capture images of a bottom surface of housing 120C. For example, in some embodiments, camera 1504, base 150, and/or infrared sensor assembly 128 may be implemented to permit camera 1504 to capture images of fiducial markers on the bottom surface of housing 120C while camera 1504 is positioned under base 150 and/or under infrared sensor assembly 128.

Figure 16A:
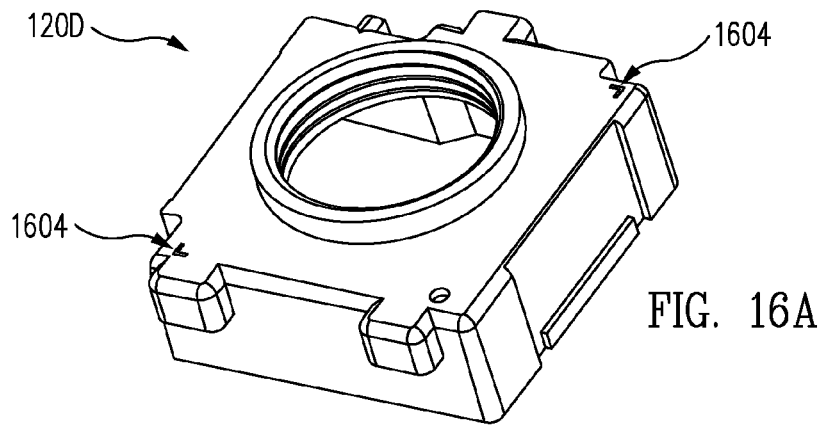
FIGS. 16A-C illustrate several views of a housing having fiducial markers in accordance with various embodiments of the disclosure.
Figure 16B:
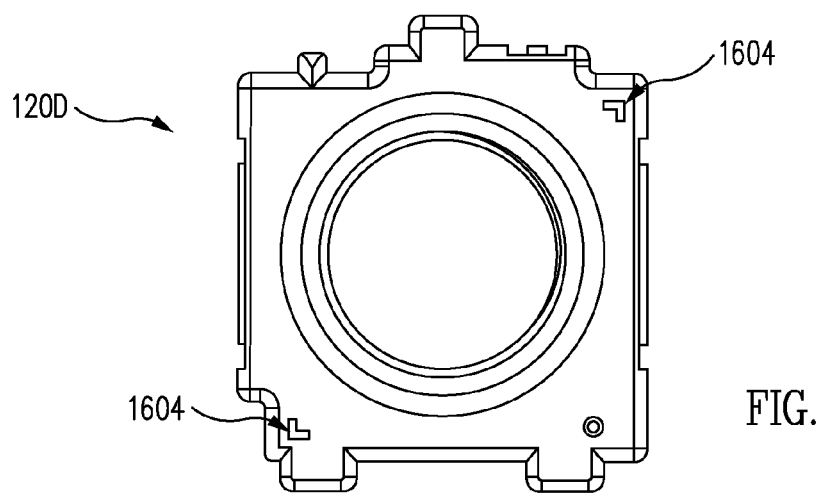
Figure 16C:
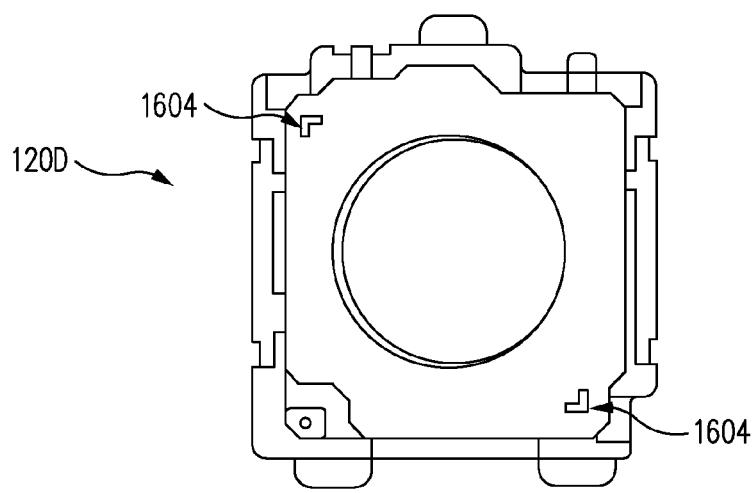

Although fiducial markers 1404 and 1406 implemented by pads 1402 on a top surface of housing 120C have been described, other fiducial markers are also contemplated. For example, FIGS. 16A-C illustrate several views of a housing 120D having fiducial markers 1604 that are positioned at other locations on top and bottom surfaces of a housing 120D.

In some embodiments, L-shaped features such as those of fiducial markers 1404 and 1604 may be preferably used, as such shapes may be readily identified and distinguished from other features (e.g., chamfered corners 1406) when analyzed by various machine vision systems (e.g., such as processing system 1520). However, fiducial markers of any desired shape (e.g., dots, crosshairs, or other shapes) may be used in other embodiments. In addition, fiducial markers may be physically implemented in any desired fashion such as conductive traces, painted markers, etched markers, molded markers, and/or others. Where appropriate, the various alignment techniques discussed with regard to the alignment of housing 120C may be used to align lens barrel 110 relative to housing 120C and/or to align shutter 1700 (further discussed herein) relative to housing 120C/lens barrel 110.

As discussed, conductive traces 1400 may also be used to provide electrical connections. As shown in FIGS. 14A-D, conductive traces 1400 include pads 1408 and areas 1410 that are electrically connected to pads 1402. Thus, when housing 120C is installed on base 1800 (see base 1800 provided by a circuit board in FIGS. 18 and 19A-B), conductive traces 1400 may pass electrical signals (e.g., control signals, data signals, power, and/or other types as appropriate) between electrical connections 1802 (e.g., pads) of base 1800 and components connected to pads 1402 (e.g., a shutter 1700 further discussed herein). Conductive traces 1400 may connect to electrical connections of base 150, circuit board 170, socket 104, and/or other components where appropriate in various installations.

Figure 17:
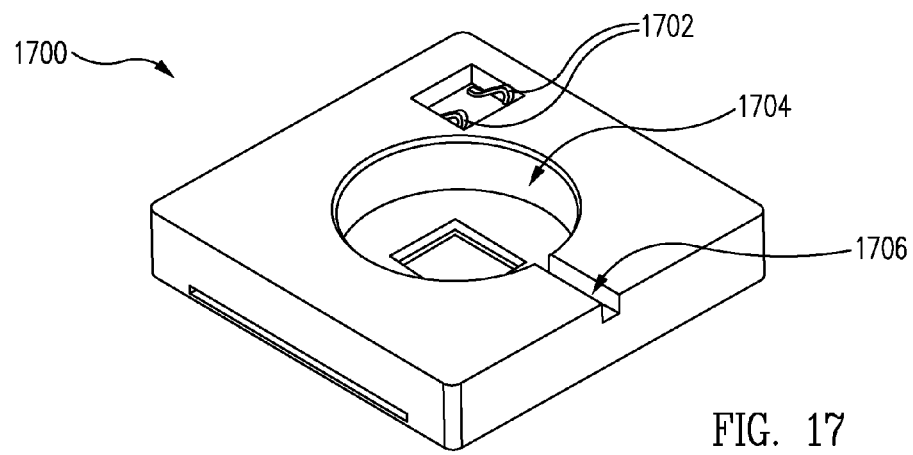
FIG. 17 illustrates a shutter in accordance with an embodiment of the disclosure.
Figure 18:
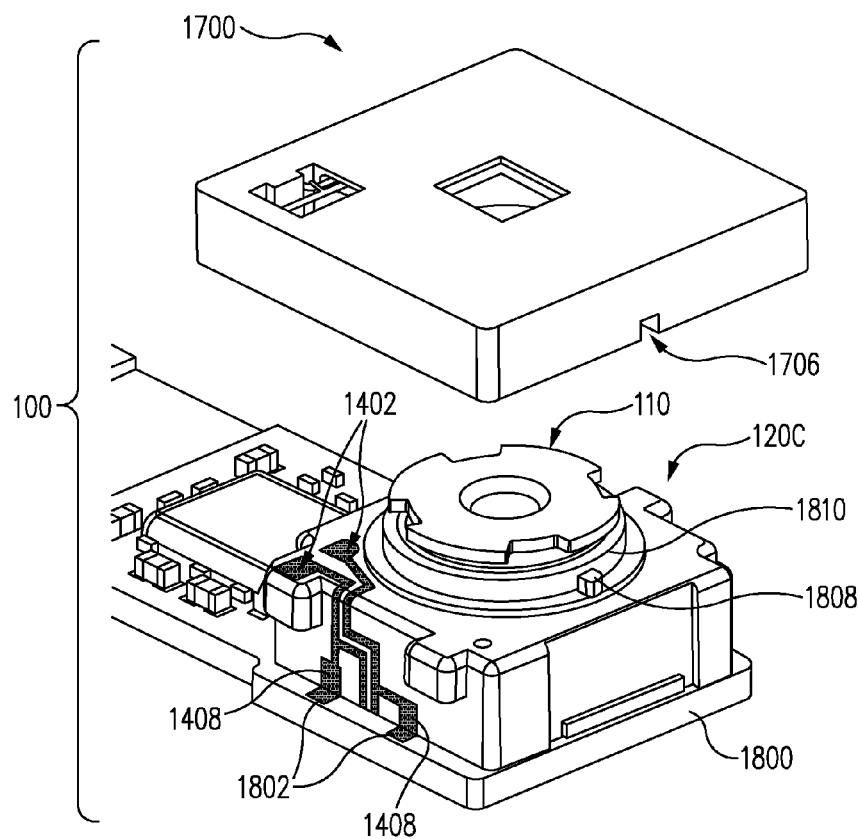
FIG. 18 illustrates the shutter of FIG. 17 positioned for assembly as part of infrared imaging module in accordance with an embodiment of the disclosure.
Figure 19A:
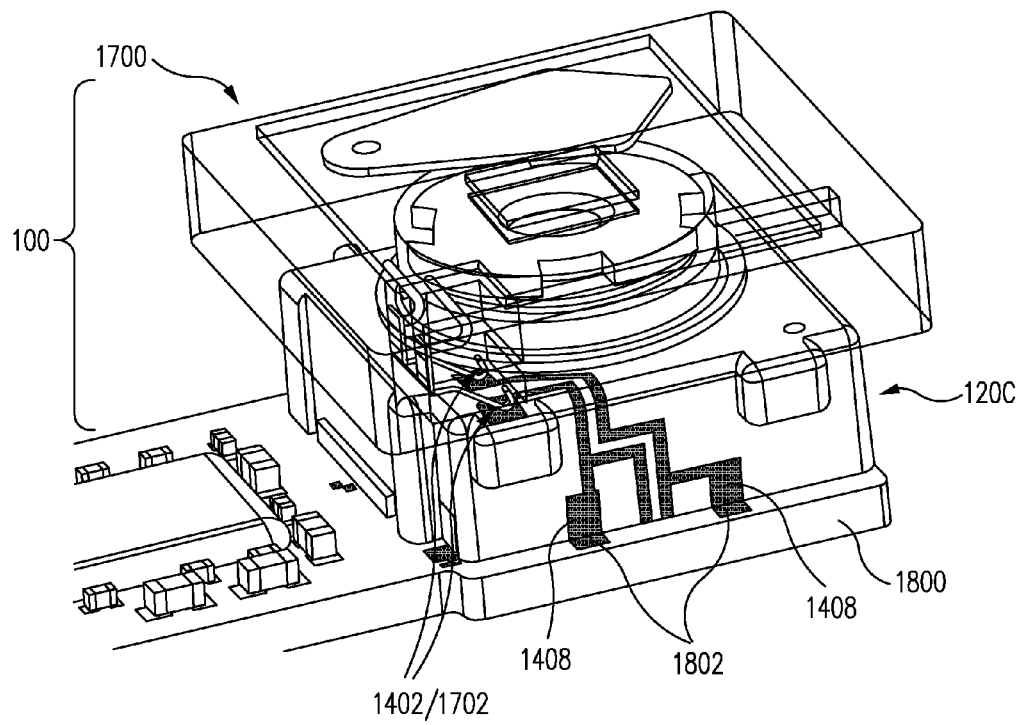
FIGS. 19A-B illustrate various views of an infrared imaging module with the shutter of FIG. 17 installed and shown in semi-transparent form to illustrate contacts of the shutter engaged with pads on an external surface of a housing in accordance with various embodiments of the disclosure.
Figure 19B:
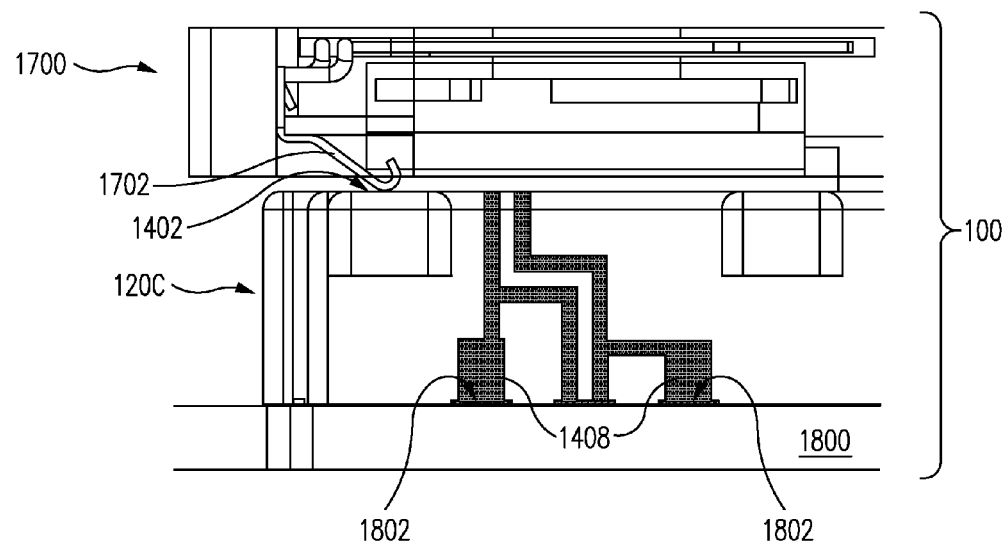

FIG. 17 illustrates a shutter 1700 that may be installed as part of infrared imaging module 100, FIG. 18 illustrates shutter 1700 positioned for assembly as part of infrared imaging module 100, and FIGS. 19A-B illustrate various views of infrared imaging module 100 with shutter 1700 shown in semi-transparent form to illustrate contacts 1702 engaged with pads 1402 on an external surface of housing 120C in accordance with various embodiments of the disclosure.

Shutter 1700 includes contacts 1702 that may engage with pads 1402 of housing 120C when shutter 1700 is installed as part of infrared imaging module 100. In some embodiments, contacts 1702 may be compression contacts (e.g., spring contacts) configured to be biased against pads 1402 when shutter 1700 is installed on housing 120C (see FIGS. 19A-B). In other embodiments, contacts 1702 may be implemented in other appropriate forms and/or may be soldered or otherwise connected to pads 1402.

Shutter 1700 also includes a recess 1704 configured to receive lens barrel 110 and an external ring 1810 of housing 120C (with threaded aperture 122C disposed therein) as shutter 1700 is installed onto housing 120C. Shutter 1700 also includes an orientation groove 1706 configured to receive an orientation tab 1808 of housing 120C to align shutter 1700 relative to housing 120C.

Figure 20:
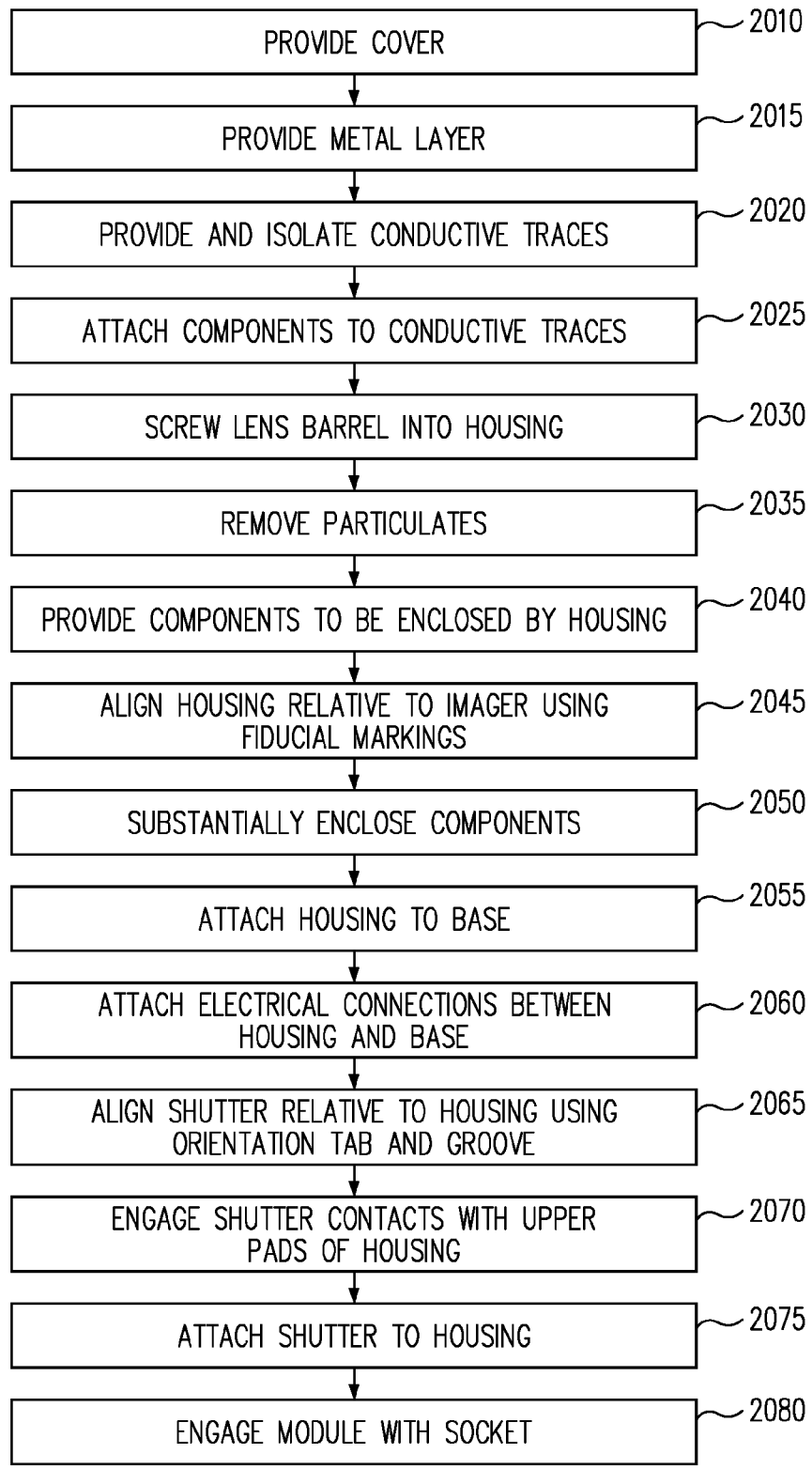
FIG. 20 illustrates a process for manufacturing an infrared imaging module in accordance with an embodiment of the disclosure.

FIG. 20 illustrates a process for manufacturing infrared imaging module 100 in accordance with an embodiment of the disclosure. Although particular operations are identified in FIG. 20, fewer or greater numbers of operations may be performed as desired in accordance with appropriate manufacturing techniques. The operations may be reordered where appropriate for the manufacture of desired embodiments of infrared imaging module 100. Although FIG. 20 will be described primarily with regard to housing 120C, the same or similar operations may be performed with other housings described herein, or variations thereof.

At operation 2010, cover 910C is provided. In some embodiments, operation 2010 may include forming cover 910C using MID techniques to partially or fully embed various electrical connections 126 and/or components (e.g., temperature measurement component 980 or others) within cover 910C. In addition to and/or in the alternative, components may be attached and/or connected in other operations of FIG. 20.

At operation 2015, metal layer 920C is provided. In some embodiments, operation 2015 may be performed by metalizing surfaces of cover 910C as part of a MID manufacturing process (e.g., as part of operation 2010), thus saving cost and time. In some embodiments, metal layer 920C may be formed as a single layer and/or several sublayers (e.g., sublayers 922, 924, 926, and/or others) in accordance with appropriate metalization techniques. In some embodiments, cover 910C may be appropriately masked during operation 2015 to define conductive traces 930C and/or areas 940C. In this regard, conductive traces 930C may be formed as portions of metal layer 920C during operation 2015. In other embodiments, conductive traces 930C and/or areas 940C may be provided in other operations.

The techniques used to provide conductive traces 930C (e.g., in operations 2010 and/or 2015) may be used to provide conductive traces 1400. For example, an external metal layer may be provided (e.g., see external metal layer 920B of FIG. 13), or cover 910C may be appropriately masked to provide conductive traces 1400.

At operation 2020, conductive traces 930C are provided (e.g., if not already provided in operation 2015). In some embodiments, operation 2020 may include etching and/or otherwise removing portions of metal layer 920C to expose areas 940C and thus define conductive traces 930C from metal layer 920C. In other embodiments, conductive traces 930C may be metal that is separately provided in operation 2020. For example, portions of metal layer 920C may be removed in areas 940C and also in areas designated to receive conductive traces 930C. One or more metal layers for conductive traces 930C may then be provided in appropriate removed areas between existing portions of metal layer 920C.

In some embodiments, operation 2020 may also include insulating (e.g., electrically isolating) conductive traces 930C from metal layer 920C (e.g., if not already performed in operation 2015). This may include, for example, maintaining voids in areas 940C, providing insulating material in areas 940C, substantially or completely surrounding conductive traces 930C with insulating material, and/or other appropriate insulating techniques. Also in operation 2020, the techniques used to provide conductive traces 930C may be used to provide conductive traces 1400.

At operation 2025, one or more components are attached to housing 120C and/or connected to conductive traces 930C and/or conductive traces 1400. For example, in one embodiment, temperature measurement component 980 may be connected to conductive traces 930C and mounted on an interior surface of housing 120C. In some embodiments, one or more components (e.g., shutter 1700) may be connected to conductive traces 1400 in subsequent operation 2070 (further discussed herein).

At operation 2030, lens barrel 110 is screwed into threaded aperture 122C provided by housing 120C. In other embodiments, lens barrel 110 may be attached to housing 120C in operation 2030 using other techniques (e.g., epoxy, frictional engagement, and/or others). In some embodiments, operation 2030 may result in the generation of particulates (e.g., caused by friction and/or engagement of lens barrel 110 with threads of aperture 122C). Accordingly, at operation 2035, such particulates may be removed (e.g., by blowing air or other gases on housing 120C, lens barrel 110, and/or other components).

At operation 2040, components of infrared imaging module 100 intended to reside within cavity 912C are provided. For example, in some embodiments, operation 2040 may include manufacturing or otherwise providing infrared sensor assembly 128 and/or other components of infrared imaging module 100.

At operation 2045, housing 120C is aligned relative to infrared sensor assembly 128 and/or base 150/1800 using various fiducial markers 1404, 1406, and/or 1604 as described herein.

At operation 2050, housing 120C is moved toward base 150/1800 (and/or base 150/1800 may be moved toward housing 120C) to substantially or completely enclose the components previously provided in operation 2040. In some embodiments, operation 2050 may include positioning infrared sensor assembly 128 and housing 120C relative to each other such that housing 120C at least substantially encloses infrared sensor assembly 128 and such that metal layer 920C (disposed on various interior surfaces of cover 910C) faces infrared sensor assembly 128. For example, cover 910C may be lowered over infrared sensor assembly 128. As another example, infrared sensor assembly 128 may be inserted into cavity 912C.

At operation 2055, housing 120C is attached to base 150/1800 (e.g., using non-conductive epoxy). At operation 2060, housing electrical connections (e.g., areas 950A and 960A of housing 120A; and areas 950C, 960C, and 1410 of housing 120C) are attached (e.g., using solder or conductive epoxy) to appropriate electrical connections of base 150/1800 (e.g., electrical connections 1108 and 1110 of base 150; and electrical connections 1802 of base 1800).

At operation 2065, shutter 1700 is aligned relative to housing 120C using orientation tab 1808, orientation groove 1706, fiducial markers 1404, and/or fiducial markers 1406. At operation 2070, shutter 1700 is moved toward housing 120C (and/or housing 120C may be moved toward shutter 1700) which brings contacts 1702 into engagement with pads 1402 of housing 120C. As discussed, contacts 1702 may be compression contacts that are biased against pads 1402 when shutter 1700 is installed on housing 120C (see FIGS. 19A-B). Also at operation 2070, lens barrel 110 and external ring 1810 are received by recess 1704, and orientation tab 1808 is received by orientation groove 1706. At operation 2075, shutter 1700 is attached to housing 120C (e.g., using epoxy and/or other appropriate techniques).

Thus, following operation 2075, an assembled infrared imaging module 100 may be provided for installation in a device. In this regard, at operation 2080, infrared imaging module 100 is engaged with socket 104, for example, in accordance with various techniques described herein. In some embodiments, operation 2080 may include inserting infrared imaging module 100 into socket 104 of host device 102 such that housing 120C engages with socket 104. Other installation techniques may also be used.

Other operations may be performed to manufacture infrared imaging module 100. For example, in some embodiments, housing 120 may be formed around various components (e.g., infrared sensor assembly 128) during its manufacture.

Other embodiments are also contemplated. For example, although metal layers 920A-C have been primarily described as being on one or more interior surfaces of covers 910A-C, one or more appropriate metal layers may be provided on various interior and/or exterior surfaces of covers 910A-D as may be desired to further realize the various emissivity, conductivity, shielding, and other advantages provided by metal layers 920A-C.

Where applicable, various embodiments provided by the present disclosure can be implemented using hardware, software, or combinations of hardware and software. Also where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa.

Software in accordance with the present disclosure, such as non-transitory instructions, program code, and/or data, can be stored on one or more non-transitory machine readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

Embodiments described above illustrate but do not limit the invention. It should also be understood that numerous modifications and variations are possible in accordance with the principles of the invention. Accordingly, the scope of the invention is defined only by the following claims.

What is claimed is:

1. An apparatus comprising:
   a housing adapted to receive an infrared sensor assembly comprising a plurality of infrared sensors configured in a focal plane array to capture thermal images of a target scene, the housing comprising:
   a cover comprising a majority of non-metal material;
   a metal layer with disposed on a majority of interior and/or exterior surfaces of the cover; and
   wherein the metal layer exhibits a higher thermal conductivity than the cover which reduces non-uniform heating of the infrared sensor assembly, wherein the metal layer is adapted to attenuate electromagnetic interference emitted by the infrared sensor assembly and shield the infrared sensor assembly from electromagnetic interference incident on the cover.

2. The apparatus of claim 1, wherein the metal layer is disposed on a majority of the interior and/or exterior surfaces of the cover, wherein the cover is comprised of a majority of non-metal material.

3. The apparatus of claim 1, wherein the metal layer exhibits a lower emissivity than the cover which reduces effects of out-of-field radiation on image frames captured by the infrared sensor assembly, wherein the cover exhibits an emissivity in a range of 0.8 to 0.95, wherein the metal layer exhibits an emissivity in a range of 0.02 to 0.11.

4. The apparatus of claim 1, wherein the metal layer comprises:
   a copper sublayer having a thickness in a range of 4 μm to 16 μm;
   a nickel sublayer having a thickness in a range of 2.5 μm to 10.5 m; and
   a gold sublayer having a thickness in a range of 0.05 μm to 0.15 μm.

5. The apparatus of claim 1, wherein the housing comprises at least one fiducial marker on a surface of the cover and adapted to be used to align the housing with the infrared sensor assembly.

6. The apparatus of claim 1, wherein the housing comprises a conductive trace electrically isolated from the metal layer, wherein the conductive trace is at least partially disposed on a surface of the cover, wherein the conductive trace is adapted to electrically connect to an external component.

7. The apparatus of claim 6, wherein the conductive trace comprises a portion of the metal layer electrically isolated from other portions of the metal layer.

8. The apparatus of claim 6, wherein the housing is a molded interconnect device (MID), wherein the conductive trace is at least partially within at least one wall of the housing.

9. The apparatus of claim 6, wherein the conductive trace is adapted to provide an electrical connection from an interior cavity enclosed by the housing to an exterior of the housing, the apparatus further comprising a temperature measurement component electrically connected to the conductive trace and adapted to be used to determine a temperature associated with the housing.

10. The apparatus of claim 6, wherein the conductive trace comprises at least one fiducial marker adapted to be used to align the housing with the infrared sensor assembly.

11. The apparatus of claim 10, wherein the fiducial marker comprises at least one of an L-shaped feature and/or a chamfered corner.

12. The apparatus of claim 10, wherein the apparatus is an infrared camera module comprising:
   the housing;
   a lens barrel installed in the housing;
   the infrared sensor assembly;
   the external device implemented as a shutter; and
   a base, wherein the housing is mounted on the base and the conductive trace is in electrical contact with the base, wherein the conductive trace is adapted to pass an electrical signal between the shutter and the base.

13. A method comprising:
   providing a cover comprising a majority of non-metal material;
   metalizing a majority of interior and/or exterior surfaces of the cover to provide a metal layer;
   wherein the cover and the metal layer comprise a housing;
   wherein the housing is adapted to receive an infrared sensor assembly comprising a plurality of infrared sensors configured in a focal plane array to capture thermal images of a target scene; and
   wherein the metal layer exhibits a higher thermal conductivity than the cover which reduces non-uniform heating of the infrared sensor assembly when the infrared sensor assembly is enclosed by the housing, wherein the metal layer is adapted to attenuate electromagnetic interference emitted by the infrared sensor assembly and shield the infrared sensor assembly from electromagnetic interference incident on the cover when the infrared sensor assembly is enclosed by the housing.

14. The method of claim 13, wherein the metal layer is disposed on a majority of the interior and/or exterior surfaces of the cover, wherein the cover is comprised of a majority of non-metal material.

15. The method of claim 13, wherein the metal layer exhibits a lower emissivity than the cover which reduces effects of out-of-field radiation on image frames captured by the infrared sensor assembly when the infrared sensor assembly is enclosed by the housing, wherein the cover exhibits an emissivity in a range of 0.8 to 0.95, wherein the metal layer exhibits an emissivity in a range of 0.02 to 0.11.

16. The method of claim 13, wherein the metalizing comprises:
providing a copper sublayer having a thickness in a range of 4 μm to 16 μm;
providing a nickel sublayer having a thickness in a range of 2.5 μm to 10.5 μm; and
providing a gold sublayer having a thickness in a range of 0.05 μm to 0.15 μm.

17. The method of claim 13, further comprising:
providing at least one fiducial marker on a surface of the cover; and
aligning the housing with the infrared sensor assembly using the fiducial marker.

18. The method of claim 13, further comprising providing a conductive trace electrically isolated from the metal layer, wherein the conductive trace is at least partially disposed on a surface of the cover, wherein the conductive trace is adapted to electrically connect to an external component.

19. The method of claim 18, wherein the conductive trace comprises a portion of the metal layer, wherein the providing the conductive trace comprises electrically isolating the conductive trace from other portions of the metal layer.

20. The method of claim 18, further comprising forming the housing as a molded interconnect device (MID), wherein the forming comprises providing the conductive trace at least partially within at least one wall of the housing.

21. The method of claim 18, wherein the conductive trace provides an electrical connection from an interior cavity enclosed by the housing to an exterior of the housing, the method further comprising electrically connecting a temperature measurement component to the conductive trace, wherein the temperature measurement component is adapted to be used to determine a temperature associated with the housing.

22. The method of claim 18, wherein the conductive trace comprises at least one fiducial marker adapted to be used to align the housing with the infrared sensor assembly.

23. The method of claim 22, wherein the fiducial marker comprises at least one of an L-shaped feature and/or a chamfered corner.

24. The method of claim 22, further comprising assembling an infrared camera module, the assembling comprising:
screwing a lens barrel into the housing;
aligning the housing with the infrared sensor assembly using the fiducial marker;
mounting the housing on a base such that the housing receives the infrared sensor assembly; and
electrically connecting a shutter to the conductive trace, wherein the conductive trace is adapted to pass an electrical signal between the shutter and the base.

* * * * *